United States Patent
Miura

(10) Patent No.: US 8,185,076 B2
(45) Date of Patent: May 22, 2012

(54) RADIO RECEIVER

(75) Inventor: Kiyoshi Miura, Kanagawa (JP);
Michiko Miura, legal representative, Kanagawa (JP)

(73) Assignee: Sony Corporation, Tokyo (JP)

( * ) Notice: Subject to any disclaimer, the term of this patent is extended or adjusted under 35 U.S.C. 154(b) by 398 days.

(21) Appl. No.: 12/582,779

(22) Filed: Oct. 21, 2009

(65) Prior Publication Data
US 2010/0097531 A1    Apr. 22, 2010

(30) Foreign Application Priority Data
Oct. 22, 2008   (JP) ................. 2008-272458

(51) Int. Cl.
  *H04B 7/00*   (2006.01)
  *H04N 5/455*  (2006.01)
(52) U.S. Cl. .............. 455/285; 455/323; 348/726
(58) Field of Classification Search .......... 455/323, 455/317, 285, 130, 302; 348/725, 726
  See application file for complete search history.

(56) References Cited

U.S. PATENT DOCUMENTS

| | | | | |
|---|---|---|---|---|
| 6,075,829 A * | 6/2000 | Hayashi et al. | ............... | 375/344 |
| 6,512,555 B1 * | 1/2003 | Patel et al. | .................... | 348/726 |
| 6,850,750 B2 * | 2/2005 | Takaki et al. | ................. | 455/324 |
| 7,002,639 B2 * | 2/2006 | Kawai | ............................. | 348/731 |
| 7,590,400 B2 * | 9/2009 | Otaka et al. | .................... | 455/312 |
| 2007/0171312 A1 * | 7/2007 | Kishi | ............................ | 348/726 |

FOREIGN PATENT DOCUMENTS

| | | |
|---|---|---|
| JP | 2002 353839 | 12/2002 |
| JP | 2004 153435 | 5/2004 |
| JP | 2005 45482 | 2/2005 |
| JP | 2005 295470 | 10/2005 |
| JP | 2005 311815 | 11/2005 |
| JP | 2006 101388 | 4/2006 |
| JP | 2008 160672 | 7/2008 |

* cited by examiner

*Primary Examiner* — Sonny Trinh
(74) *Attorney, Agent, or Firm* — Frommer Lawrence & Haug LLP; William S. Frommer

(57) ABSTRACT

Disclosed herein is a radio receiver including: an oscillator circuit including a phase-locked circuit and a voltage-controlled oscillator circuit; a first frequency divider circuit; a frequency converter circuit; a signal adding circuit; a test signal generating circuit including at least one second frequency divider circuit; and a controlling section configured to set frequency dividing factors.

13 Claims, 16 Drawing Sheets

$f_{TONE(+)} = f_P + f_Q$
$f_{TONE(-)} = f_P - f_Q$

EXAMPLE OF CIRCUIT OF N/N +0.5 FREQUENCY DIVIDER

TIMING DIAGRAM FOR N=7

TIMING DIAGRAM FOR N=7.5

TIMING DIAGRAM FOR N=6.5

FREQUENCY DIVIDING RATIO CONTROL

| | CONTROL SIGNAL | 1st cycle | 2nd cycle | 3rd cycle | 4th cycle |
|---|---|---|---|---|---|
| 2m | K | m | m | m | m |
| | SEL | 0 | 0 | 0 | 0 |
| 2m+1 | K | m | m+1 | m | m+1 |
| | SEL | 0 | 0 | 0 | 0 |
| 2m+0.5 | K | m | m | m+1 | m |
| | SEL | 0 | 1 | 1 | 0 |
| 2m+1+0.5 | K | m | m+1 | m+1 | m+1 |
| | SEL | 0 | 1 | 1 | 0 |

RADIO RECEIVER

BACKGROUND OF THE INVENTION

1. Field of the Invention

The present invention relates to a radio receiver, and particularly to a radio receiver having a test signal generating circuit used to adjust an image frequency suppression ratio (IMRR).

2. Description of the Related Art

The image frequency suppression ratio (IMRR) is an important element in a low-intermediate frequency (LOW-IF) receiver.

A television receiver, in particular, is desired to have an IMRR of −60 dB or more. In such a case, it is difficult to achieve the above IMRR unless some adjusting means is used.

Japanese Patent Laid-Open No. 2005-295470 (hereinafter referred to as Patent Document 1) and Jean Robert Tourret, et al. (NXP), "SiP Tuner with Integrated LC Tracking filter for Both Cable and Terrestrial TV Reception," IEEE JSSC, pp. 2809-2821, Vol. 12, December 2007 (hereinafter referred to as Non-Patent Document 1) propose including a test signal generating circuit in an electronic circuit within a radio receiver, generating a test signal in an RF frequency band in the test signal generating circuit, and adjusting the IMRR using the test signal.

Incidentally, the test signal can be used also to adjust a tracking filter and an RF amplifier in an RF signal processing section of the radio receiver.

In addition, to achieve the IMRR of −60 dB or more needs sufficiently good purity (accuracy) of the test signal. This is, for example, because the phase noise of the test signal appears on an original received signal side.

A case is assumed in which at a time of adjustment of the radio receiver, the adjustment is performed by setting the test signal at an image frequency and superimposing (injecting) the test signal on the received signal of the receiver, and detecting the image-suppressed signal as an intermediate frequency (IF) signal.

In this case, supposing that a detector of the IF signal has a band of 6 MHz, the phase noise of the test signal and an image signal cannot be distinguished from each other unless the phase noise is not more than $[-60-10 \text{ k} \times \log(6M)] = -128$ dBc/Hz.

It is difficult to form a voltage-controlled oscillator (VCO) of an ordinary ring oscillator type as a circuit for generating the test signal having such a phase noise. The circuit is formed by an LC resonance type VCO.

SUMMARY OF THE INVENTION

However, an LC resonance type VCO using an inductor and a capacitor generally has a larger size than a ring oscillator type VCO.

A VCO used in a television receiver, in particular, needs to have at least a wide oscillation frequency range of one octave or more, for example. Thus, usually, when a voltage-controlled oscillator (VCO) for generating a local oscillating signal is mounted in the circuit of the receiver in an on-chip form, a plurality of VCOs having different oscillation characteristics for generating a plurality of local oscillating signals are mounted in the receiver and used properly according to a channel frequency being used.

If techniques disclosed in Patent Document 1 and Non-Patent Document 1 described above are applied, twice the number of VCOs is necessary. As a result, a problem of an increase in chip area in the receiver is encountered. This is a burden on a small receiver, in particular.

Further, control of a phase-locked loop (PLL) in addition to the VCO for generating the test signal is necessary. As a result, complexity of control of a plurality of PLLs is encountered.

There is thus a desire to provide a radio receiver having a circuit configured to generate a test signal used to adjust the image frequency suppression ratio (IMRR) which test signal is easy to control and has high purity without increase in size.

There is also a desire to provide a radio receiver having a circuit configured to generate a test signal usable for adjustment of a tracking filter and a radio frequency amplifier in the radio receiver which test signal is easy to control and has high purity without increase in size.

According to an embodiment of the present invention, there is provided a radio receiver including: an oscillator circuit configured to generate an oscillating signal of a first oscillation frequency, the oscillator circuit including a phase-locked circuit and a voltage-controlled oscillator circuit; and a first frequency divider circuit configured to generate a first oscillating signal and a second oscillating signal having a second oscillation frequency and orthogonal to each other by frequency-dividing the oscillating signal generated by the oscillator circuit by a first frequency dividing factor. The radio receiver also includes: a frequency converter circuit configured to generate a first intermediate frequency signal and a second intermediate frequency signal having an intermediate frequency and orthogonal to each other by multiplying a received radio frequency signal by the first oscillating signal and the second oscillating signal generated in the first frequency divider circuit and orthogonal to each other; and a signal adding circuit configured to generate an intermediate frequency signal synthesized by adding together the first intermediate frequency signal and the second intermediate frequency signal generated in the frequency converter circuit and orthogonal to each other. The radio receiver further includes: a test signal generating circuit configured to generate a test signal by frequency-dividing the oscillating signal having the first oscillation frequency generated in the oscillator circuit by a second frequency dividing factor, and inject the test signal into the received radio frequency signal in an input section of the frequency converter circuit, the test signal generating circuit including at least one second frequency divider circuit; and a controlling section configured to set the first frequency dividing factor of the first frequency divider circuit and the second frequency dividing factor of the second frequency divider circuit according to a channel frequency.

The above-described test signal is injected into the received radio signal to adjust the image frequency suppression ratio (IMRR).

In the test signal generating circuit, the second frequency divider circuit frequency-divides a first oscillating signal of a first local oscillation frequency $f_{VCO}$ by a frequency dividing factor of P specified by the controlling section, thereby generates a test signal having a frequency ($f_{VCO}/P$), and superimposes (injects) the test signal into the received RF signal.

Because the test signal generating circuit uses the first oscillating signal of the first local oscillation frequency, it is not necessary to provide a VCO and a PLL as a circuit corresponding to a local oscillating signal within the test signal generating circuit. It suffices only to set the first and second frequency dividing factors according to a channel by the controlling section. As a result, the receiver according to the present embodiment has a simple constitution. In particular, the circuit configuration does not become complex even when the number of channels is increased.

Further, the local oscillating signal from which the test signal originates is the same as the local oscillating signal used for frequency conversion in the frequency converter circuit. Thus, problems relating to phase noise (phase error) do not occur.

In addition, according to another embodiment of the present invention, there is provided a radio receiver including: an antenna; a switch circuit; a first band-pass filter configured to pass a band component of a first band-pass characteristic of a signal input via the switch circuit; and a high-frequency gain controlling type amplifier circuit configured to control a gain of an output signal of the first band-pass filter. The radio receiver also includes: a second band-pass filter configured to pass a band component of a second band-pass characteristic of an output signal of the high-frequency gain controlling type amplifier circuit, and output the passed band component to a frequency converter circuit; the frequency converter circuit configured to generate a first intermediate frequency signal and a second intermediate frequency signal having an intermediate frequency and orthogonal to each other by multiplying the received radio frequency signal by a first oscillating signal and a second oscillating signal generated in a frequency divider circuit and orthogonal to each other; and an amplitude and phase correcting circuit configured to correct amplitudes and phases of the two intermediate frequency signals generated in the frequency converter circuit and orthogonal to each other. The radio receiver further includes: an image removing filter configured to remove an image signal, the image removing filter being disposed in a stage succeeding the amplitude and phase correcting circuit and preceding a signal adding circuit; the signal adding circuit configured to generate an intermediate frequency signal synthesized by adding together the first intermediate frequency signal and the second intermediate frequency signal generated in the image removing filter and orthogonal to each other; an oscillator circuit configured to generate an oscillating signal of a first oscillation frequency, the oscillator circuit including a phase-locked circuit and a voltage-controlled oscillator circuit; and the frequency divider circuit configured to generate the first oscillating signal and the second oscillating signal having a second oscillation frequency and orthogonal to each other by frequency-dividing the oscillating signal generated by the oscillator circuit by a first frequency dividing factor. The radio receiver still further includes: a detector circuit configured to detect the intermediate frequency signal generated in the signal adding circuit; and a test signal generating circuit configured to generate a test signal by frequency-dividing the oscillating signal having the first oscillation frequency generated in the oscillator circuit by a second frequency dividing factor, and input the test signal to another terminal of the switch circuit than a terminal supplied with the signal from the antenna, the test signal generating circuit including at least one second frequency divider circuit.

According to the present invention, it is possible to provide a radio receiver having a circuit configured to generate a test signal used to adjust the image frequency suppression ratio (IMRR) which test signal is easy to control and has high purity without increase in size.

In addition, according to the present invention, it is possible to provide a radio receiver having a circuit configured to generate a test signal usable for adjustment of a tracking filter and a radio frequency amplifier in the radio receiver which test signal is easy to control and has high purity without increase in size.

DETAILED DESCRIPTION OF THE PREFERRED EMBODIMENTS

First Embodiment

A first embodiment of a receiver according to the present invention will be described with reference to FIG. 1.

[Configuration]

Figure 1:
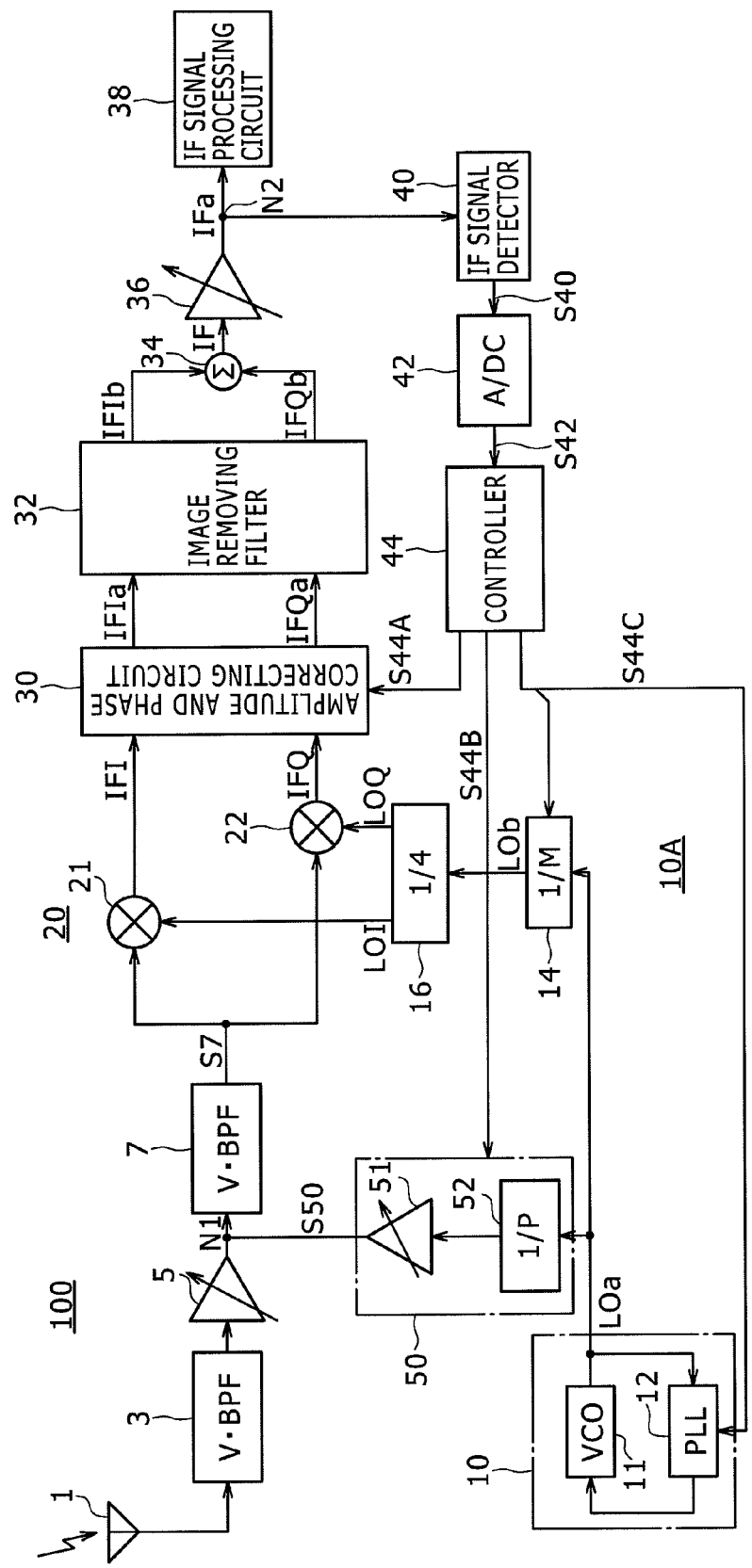
FIG. 1 is a block diagram of a radio receiver according to a first embodiment of the present invention.

FIG. 1 is a block diagram of a radio receiver according to a first embodiment of the present invention.

The radio receiver 100 illustrated in FIG. 1 includes an antenna 1, a first variable band-pass filter (V-BPF) 3, a first gain-variable type low noise amplifier circuit (LNA) 5, and a second variable band-pass filter 7. The V-BPFs 3 and 7 function as a tracking filter.

The radio receiver 100 includes a first oscillator circuit 10 that is formed by a voltage-controlled oscillator (VCO 11) and a phase-locked loop (PLL) 12 and which generates a first oscillating signal LOa of a first local oscillation frequency $f_{VCO}$.

The radio receiver 100 also includes a second oscillator circuit 10A formed by a frequency divider circuit 14 with a frequency dividing factor of M and a frequency divider and phase shifter 16. The frequency divider circuit 14 and the frequency divider and phase shifter 16 form a first frequency divider circuit in embodiments of the present invention. Thus, the second oscillator circuit 10A is the same as the first frequency divider circuit.

The radio receiver 100 includes a frequency converter circuit 20 having a first mixer 21 and a second mixer 22.

The radio receiver 100 also includes an IF signal detector 40, an analog/digital converter (A/DC) 42, and a controller (controlling means) 44.

The radio receiver 100 further includes an amplitude and phase correcting circuit 30 for correcting amplitude and phase, an image removing filter 32, a signal adding circuit 34, a second gain-variable type low noise amplifier circuit (LNA) 36, and an intermediate frequency (IF) signal processing circuit 38.

The radio receiver 100 includes a test signal generating circuit 50.

[Test Signal Generating Circuit]

The test signal generating circuit 50 includes a gain-variable type low noise amplifier circuit 51 and a frequency divider circuit 52 with a frequency dividing factor of P (frequency dividing ratio of 1/P).

The frequency dividing factor of P of the frequency divider circuit 52 is set by the controller 44.

[Basic Circuit Operation]

Basic operation of each circuit in the radio receiver 100 will be described.

(1) Antenna 1, V-BPFs 3 and 7, and LNA 5

The antenna 1 for example receives an RF signal of a radio frequency $f_{RF}$ in television broadcasting.

The variable band-pass filters (V-BPFs) 3 and 7 can vary the pass band (band pass) frequency thereof. The pass band of the RF signal received by the antenna 1 is set according to a channel selection by a user of the radio receiver 100. As a result, radio waves of unnecessary channel frequencies are removed by the V-BPFs 3 and 7, and thus signals of the unnecessary channel frequencies are prevented from being input to circuits in stages subsequent to the V-BPFs 3 and 7. The V-BPFs 3 and 7 thus function as a tracking filter or a channel selecting filter.

The gain-variable type low noise amplifier circuit 5 is a gain controlling type low noise amplifier circuit that can change the gain of the RF signal as a whole according to the strength of the radio waves received by the antenna 1 and which operates at a high frequency.

(2) Oscillator Circuit 10 and Frequency Converter Circuit 20

The PLL 12 in the oscillator circuit 10 outputs a VCO driving voltage signal corresponding to the oscillation frequency set by a control signal S44C output from the controller 44.

The VCO 11 generates a signal of the oscillation frequency corresponding to the voltage input to the VCO 11, that is, the first oscillating signal LOa of the first local oscillation frequency $f_{VCO}$.

The first oscillator circuit 10 thus functions as a phase-locked local oscillator circuit.

The frequency divider circuit 14 in the second oscillator circuit 10A generates a second oscillating signal LOb obtained by dividing the first oscillating signal LOa of the first local oscillation frequency $f_{VCO}$ with a frequency dividing ratio of (1/M) on the basis of the frequency dividing factor of M set by the control signal S44C from the controller 44.

The frequency divider and phase shifter 16 in the second oscillator circuit 10A generates a signal of a local oscillation frequency $f_{LO}$ by further dividing the second oscillating signal LOb output from the frequency divider circuit 14 into (¼). The frequency divider and phase shifter 16 further generates two signals orthogonal to each other (having a phase difference of 90°, that is, a local oscillating signal LOI of an in-phase component and a local oscillating signal LOQ of a quadrature component.

The local oscillation frequency $f_{LO}$ of the local oscillating signal LOI of the in-phase component and the local oscillating signal LOQ of the quadrature component defines the conversion of an RF signal output from the second variable band-pass filter 7 into an IF signal in the frequency converter circuit 20.

A combined frequency dividing factor (4×M) of the frequency dividing factor of M of the frequency divider circuit 14 and the frequency dividing factor of four of the frequency divider and phase shifter 16 defines the generation of the local oscillating signal LOI of the in-phase component and the local oscillating signal LOQ of the quadrature component, which have the frequency $f_{LO}$ and are orthogonal to each other, by frequency-dividing the first oscillating signal LOa of the first local oscillation frequency $f_{VCO}$.

The frequency dividing factor of M in the frequency divider circuit 14 can be set by the controller 44 in order to handle a lower reception frequency.

The frequency division into ¼ is performed in the frequency divider and phase shifter 16 in order to generate the two signals LOI and LOQ having a phase difference of 90° without depending on the duty ratio of the VCO 11 in the first oscillator circuit 10. Incidentally, the frequency divider and phase shifter 16 is not limited to the (¼) frequency division, but the two signals LOI and LOQ having a phase difference of 90° can be generated also by (½) frequency division.

The two local oscillating signals LOI and LOQ thus generated and orthogonal to each other are used for frequency conversion from a signal of a radio frequency to a signal of an intermediate frequency in the frequency converter circuit 20.

(3) Frequency Converter Circuit 20

The mixer 21 performs frequency conversion by multiplying the RF signal output from the band-pass filter 7 by the local oscillating signal LOI of the in-phase component of the local oscillation frequency $f_{LO}$, the local oscillating signal LOI being output from the frequency divider and phase shifter 16. The mixer 21 thereby generates an IF signal IFI of an in-phase component.

Similarly, the mixer 22 performs frequency conversion by multiplying the RF signal output from the band-pass filter 7 by the local oscillating signal LOQ of the quadrature component of the local oscillation frequency $f_{LO}$, the local oscillating signal LOQ being output from the frequency divider and phase shifter 16. The mixer 22 thereby generates an IF signal IFQ of a quadrature component.

(4) Amplitude and Phase Correcting Circuit 30 and Image Removing Filter 32

The amplitude and phase correcting circuit 30 corrects the amplitude and phase of the IF signal IFI of the in-phase component and the IF signal IFQ of the quadrature component which signals have been frequency-converted into an IF band in the frequency converter circuit 20 according to a control signal S44A from the controller 44.

The image removing filter 32 is also a band-pass filter. The variable band-pass filters 3 and 7 functioning as a tracking filter may not be able to completely remove the frequency components of channels adjacent to the channel selected by the user. The image removing filter 32 accordingly removes the signals of unused channels to a sufficiently ignorable degree.

Relation between processing contents of the amplitude and phase correcting circuit 30 and the image removing filter 32 and processing contents of the controller 44 will be described in detail.

(5) Signal Adding Circuit 34, Amplifier Circuit 36, and IF Signal Processing Circuit 38

The signal adding circuit 34 generates an IF signal by adding together (synthesizing) the IF signals IFI and IFQ of the two components that are output from the image removing filter 32 and orthogonal to each other.

The gain-variable type low noise amplifier circuit 36 amplifies the IF signal generated in the signal adding circuit 34.

The IF signal processing circuit 38 performs various signal processing of the receiver 100 which processing is performed using the IF signal generated in the signal adding circuit 34, such for example as the decoding of an image signal and an audio signal and reproduction processing.

(6) IF Signal Detector 40 and Controller 44

The IF signal detector 40 detects the IF signal generated in the signal adding circuit 34.

The A/DC 42 changes the signal in an analog form detected by the IF signal detector 40 to a digital form processible in the controller 44.

The controller 44 performs the following control processes on the basis of the IF signal detected in the IF signal detector 40 and converted into the digital form in the A/DC 42.

(a) Generate a control signal S44A for amplitude and phase adjustment in the amplitude and phase correcting circuit 30

(b) Generate a control signal S44B for setting the frequency dividing factor of P in the test signal generating circuit 50 and a control signal S44C for setting the frequency dividing factor of M of the frequency divider circuit 14.

Thus, the controller 44 can be formed with for example an arithmetic and control unit CPU configured by using a computer having an arithmetic processing function and a memory for storing a table of combinations of frequency dividing ratios to be described later and the like.

Control of the amplitude and phase correcting circuit 30 by the controller 44 will be described.

When the amplitude and phase correcting circuit 30 corrects the IF signal IFI of the in-phase component and the IF signal IFQ of the quadrature component so as to make the IF signal IFI of the in-phase component and the IF signal IFQ of the quadrature component completely free from an amplitude error and a phase error, the image removing filter 32 can completely remove the image of an unnecessary channel.

Usually, an amplitude error and a phase error occur between the two different IF signals IFI and IFQ due to variations between elements of electronic circuits forming the radio receiver 100. Therefore the amplitude and phase correcting circuit 30 corrects the amplitude error and the phase error.

The amplitude and phase correcting circuit 30 corrects the amplitude and phase of the IF signals so as to minimize an actual image signal. For this, the controller 44 generates the control signal S44A for adjusting an amount of correction of the amplitude and phase correcting circuit 30 on the basis of the detected value of the IF signal detector 40, and then outputs the control signal S44A to the amplitude and phase correcting circuit 30. The amplitude and phase correcting circuit 30 corrects the amplitude and phase of the IF signals according to the control signal S44A.

(7) Test Signal Generating Circuit 50

The frequency divider circuit 52 in the test signal generating circuit 50 generates a test signal S50 having a tone frequency $f_{TONE}$ by frequency-dividing the first oscillating signal LOa of the first local oscillation frequency $f_{VCO}$, the first oscillating signal LOa being output from the first oscillator circuit 10, by the frequency dividing factor of P specified by the controller 44.

The gain-variable type low noise amplifier circuit 51 within the test signal generating circuit 50 adjusts the gain of the test signal S50 having the tone frequency $f_{TONE}$ of ($f_{VCO}$/P), the test signal S50 being generated in the frequency divider circuit 52.

The test signal generating circuit 50 thus generates the test signal S50 having the tone frequency $f_{TONE}$ of ($f_{VCO}$/P) by frequency-dividing the first oscillating signal LOa of the first local oscillation frequency $f_{VCO}$ by the frequency dividing factor of P, the first oscillating signal LOa being output from the first oscillator circuit 10. The test signal generating circuit 50 superimposes (injects) the test signal S50 on the received RF signal at a node N1 positioned in a stage preceding the frequency converter circuit 20.

[Features of Constitution of Present Embodiment]

The test signal generating circuit 50 uses the first oscillating signal LOa of the first local oscillation frequency $f_{VCO}$, the first oscillating signal LOa being used to generate the local oscillating signal LOI of the in-phase component and the local oscillating signal LOQ of the quadrature component, which signals LOI and LOQ are generated in the second oscillator circuit 10A, have the frequency $f_{LO}$, and are orthogonal to each other. As a result, it is not necessary to provide a VCO and a PLL as a circuit corresponding to a local oscillating signal for generating the test signal S50 within the test signal generating circuit 50. That is, it suffices only to provide the frequency divider circuit 52 forming the test signal generating circuit 50 according to the present embodiment and adjust the frequency dividing factor of P by the controller 44 according to a channel frequency. As a result, the receiver according to the present embodiment has a simple constitution.

In particular, the receiver according to the present embodiment has an advantage in that the circuit configuration does not become complex even when the number of channels is increased.

Further, the signal from which the test signal S50 originates is the same first oscillating signal LOa of the first local oscillation frequency $f_{VCO}$ from which signal the signals LOI and LOQ used for frequency conversion in the frequency converter circuit 20 originate in the frequency divider circuit 14 and the frequency divider and phase shifter 16. There is thus another advantage in that problems relating to phase noise (phase error) do not occur.

[Example of Operation]

An example of operation will be described assuming a case where the receiver 100 illustrated in FIG. 1 is applied to a terrestrial television receiver.

Further, the above-described features of the present embodiment will be described in more detail as differences from techniques in the past in the case where the radio receiver 100 according to the present embodiment is applied to a terrestrial television receiver.

Each channel of a television signal is assigned a frequency band of 6 to 8 MHz, for example.

In a low IF system as in the radio receiver 100 according to the present embodiment, an IF center frequency is set at about 4 to 5 MHz. Reasons for this are to avoid flicker noise and to set the lowest frequency of a channel at about 1 MHz or more. Further, using too high an IF frequency is disadvantageous for circuit design. Therefore too high a frequency is not used.

From the above, the test signal S50 according to the present embodiment needs to have a frequency of 1 to 9 MHz as IF frequency.

On the other hand, the radio receiver 100 needs to cover television reception frequencies from the vicinity of 40 MHz to the vicinity of 900 MHz to handle a plurality of channels.

In the constitution of the receiver 100 illustrated in FIG. 1, the first local oscillation frequency $f_{VCO}$ of the first oscillating signal LOa generated in the first oscillator circuit 10 is set at 1800 MHz to 3600 MHz, for example.

In this case, frequencies from 450 to 900 MHz can be covered when the frequency dividing factor of the frequency divider circuit 14 is M=1, and frequencies from 225 to 450 MHz can be covered when the frequency dividing factor of the frequency divider circuit 14 is M=2.

Even lower frequency ranges can be covered when the frequency dividing factor of M of the frequency divider circuit 14 is further increased to a power of two such as four, eight or the like.

An upper local system is assumed. In the upper local system, the local oscillation frequency $f_{LO}$ of the local oscillating signal LO generated via the frequency divider circuit 14 and the frequency divider and phase shifter 16 is made higher than a reception center frequency $f_{RF}$ by an IF center frequency $f_{IF}$. As a result, the reception center frequency $f_{RF}$ is ($f_{RF}=f_{LO}-f_{IF}$). On the other hand, an image center frequency $f_{IM}$ is ($f_{IM}=f_{LO}+f_{IF}$).

For example, when the local oscillation frequency $f_{LO}$=400 MHz, the reception center frequency $f_{RF}$=396 MHz, and the image center frequency $f_{IM}$=404 MHz.

Incidentally, image adjustment does not need to be performed at the image center frequency $f_{IM}$, and it suffices for the tone frequency $f_{TONE}$ of the test signal S50 to fall within an IF frequency band. Thus, for image adjustment, it suffices for the tone frequency $f_{TONE}$ of the test signal S50 to be within a range of 401 to 409 MHz.

When the reception center frequency $f_{RF}$ and the image center frequency $f_{IM}$ are down-converted to fall within the IF frequency band in the frequency converter circuit 20, the reception center frequency $f_{RF}$ and the image center frequency $f_{IM}$ become a same frequency, and it is thus difficult to distinguish a reception frequency signal and an image frequency signal from each other.

Thus, when the test signal S50 has some signal component such for example as a spurious component at the reception frequency separated from the tone frequency $f_{TONE}$ by twice the frequency $f_{IF}$, the amplitude and phase correcting circuit 30 cannot adjust a phase error.

Because phase noise is also included as a signal component, the phase noise of the test signal S50 is limited from a required image frequency suppression ratio (IMRR) and the band of the IF signal detector 40.

Hence, in a terrestrial television receiver in the past, a test signal generating circuit is usually required to have a phase-locked loop (PLL) equal in performance to a circuit for generating a local oscillating signal.

In embodiments of the present invention, as described above, the test signal generating circuit 50 generates the test signal S50 from the first oscillating signal LO of the local oscillation frequency $f_{LO}$, the first oscillating signal LO being generated in the first oscillator circuit 10. Therefore the circuit configuration is simplified.

Incidentally, the local oscillating signal from which the test signal S50 originates is the same first oscillating signal LO from which the local oscillating signals LOI and LOQ used in the frequency converter circuit 20 originate. Therefore problems relating to phase noise (phase error) do not occur.

[Relation Between Reception Center Frequency $f_{RF}$ and IF Center Frequency $f_{IF}$]

Figure 2:
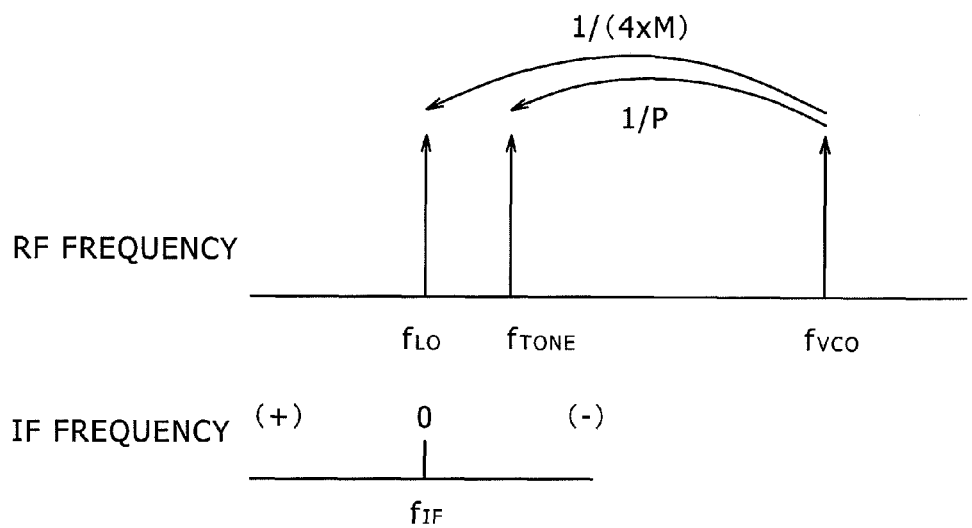
FIG. 2 is a diagram illustrating relation between a reception center frequency $f_{RF}$ and an IF center frequency $f_{IF}$.

FIG. 2 is a diagram illustrating relation between the reception center frequency $f_{RF}$ and the IF center frequency $f_{IF}$.

A frequency divided into [1/(4×M)] in total is obtained by dividing the first local oscillation frequency $f_{VCO}$ into (1/M) in the frequency divider circuit 14 and further dividing the result into (¼) in the frequency divider and phase shifter 16.

Meanwhile, the first local oscillation frequency $f_{VCO}$ is divided into (1/P) in the frequency divider circuit 52 in the test signal generating circuit 50.

M=8 and P=30 can be adopted as a combination of frequency dividing factors where a difference between the two divided frequencies is the IF center frequency $f_{IF}$ of the IF signal.

Incidentally, in FIG. 2, a tone IF frequency is defined as ($f_{LO}-f_{TONE}$) using the frequency $f_{TONE}$ of the test signal S50.

For example, when the first local oscillation frequency $f_{VCO}$ is 2600 MHz, $f_{LO}=f_{VCO}/(4\times M)=81.25$ MHz, and $f_{TONE}=f_{VCO}/P=86.67$ MHz, and thus the tone frequency $f_{TONE}$ of the test signal S50 is higher than the local oscillation frequency $f_{LO}$ by 5.42 MHz.

Because the test signal generating circuit 50 generates the test signal S50 by frequency-dividing the oscillating signal LO of the first local oscillation frequency $f_{VCO}$, the test signal S50 itself does not have a spurious component near the reception center frequency $f_{RF}$.

When the frequency-divided signals are a rectangular wave (pulse wave), a harmonic component is included. Therefore the oscillating signal of the oscillation frequency $f_{LO}$ generally includes a harmonic component.

When the frequency converter circuit 20 mixes the harmonic components of the two signals with each other, the frequency components are also included, but become harmonic components of the IF center frequency $f_{IF}$ in the IF frequency signals.

As a result, by making band setting such that even when the harmonic components are within the band of the image removing filter 32, the harmonic components are outside the band of the IF signal detector 40, adjustment for image suppression in the image removing filter 32 is not affected.

Figure 3:
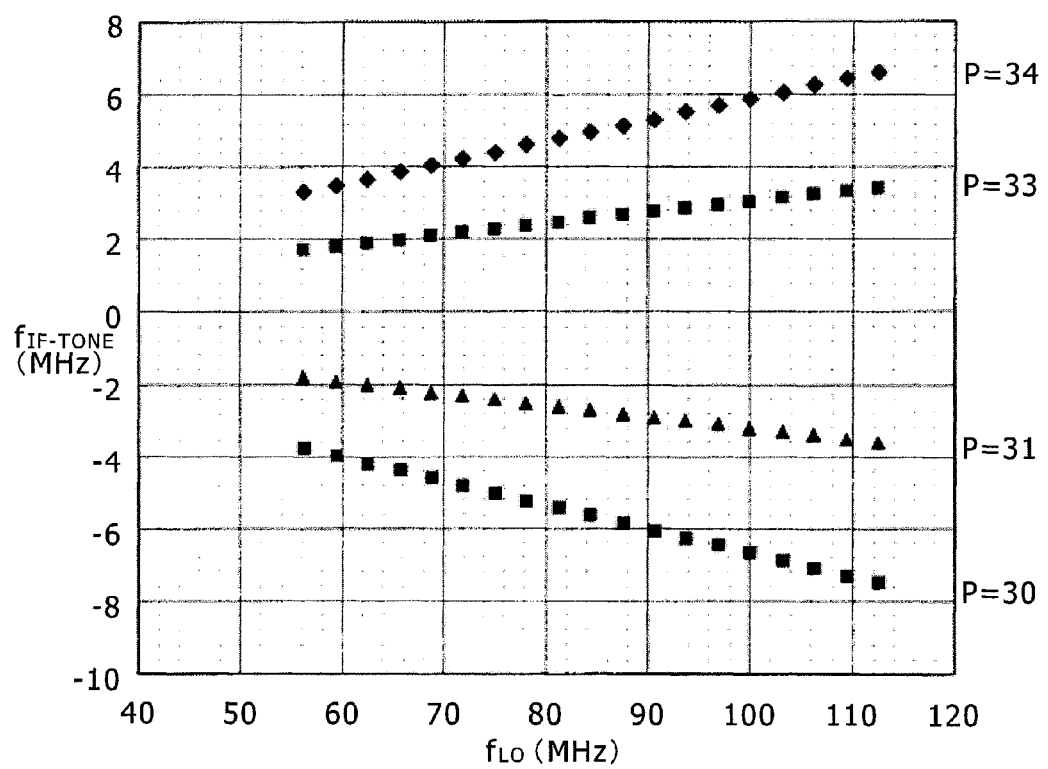
FIG. 3 is a graph obtained by plotting a second local oscillation frequency $f_{LO}$ and the tone frequency $f_{TONE}$ of a test signal when a local oscillation frequency $f_{VCO}$ is changed and the frequency dividing factor of P of a frequency divider circuit within a test signal generating circuit in FIG. 1 is changed.

FIG. 3 is a graph obtained by plotting the local oscillation frequency $f_{LO}$ and the tone IF frequency $f_{TONE}$ when the first local oscillation frequency $f_{VCO}$ is changed in steps of 100 MHz in an oscillation frequency range of 1800 to 3600 MHz of the first local oscillation frequency $f_{VCO}$ and the frequency dividing factor of P of the frequency divider circuit 52 is set at P=30, 31, 33, and 34.

As described above, the IF tone frequency $f_{IF\text{-}TONE}$ is defined as ($f_{IF\text{-}TONE}=f_{LO}-f_{TONE}$). It should thus be understood that an image signal in the low local system is generated at the frequency dividing factor of P=33 and 34 and that an image signal in the upper local system is generated at the frequency dividing factor of P=31 and 30.

Incidentally, for switching between the low local system and the upper local system, it suffices to interchange the in-phase component LOI and the quadrature component LOQ of the oscillation frequency $f_{LO}$ and input the in-phase component LOI and the quadrature component LOQ to the mixers 21 and 22 of the frequency converter circuit 20.

In the receiver 100 according to the first embodiment described with reference to FIG. 1, when the first local oscillation frequency $f_{VCO}$ is determined, the reception center frequency $f_{RF}$ and the IF tone frequency $f_{IF\text{-}TONE}$ are both determined uniquely. That is, there is a limitation in that the reception center frequency $f_{RF}$ and the IF tone frequency $f_{IF\text{-}TONE}$ cannot be set independently of each other. As a result, adjustment in an arbitrary reception channel cannot be performed.

When an amplitude error, a phase error and the like caused by for example variations between circuit elements of an IF circuit, for example the frequency converter circuit 20, the amplitude and phase correcting circuit 30, and the image removing filter 32 are a main factor in degrading image suppression, these errors do not depend on reception frequency, and therefore image adjustment can be performed effectively.

Figure 4:
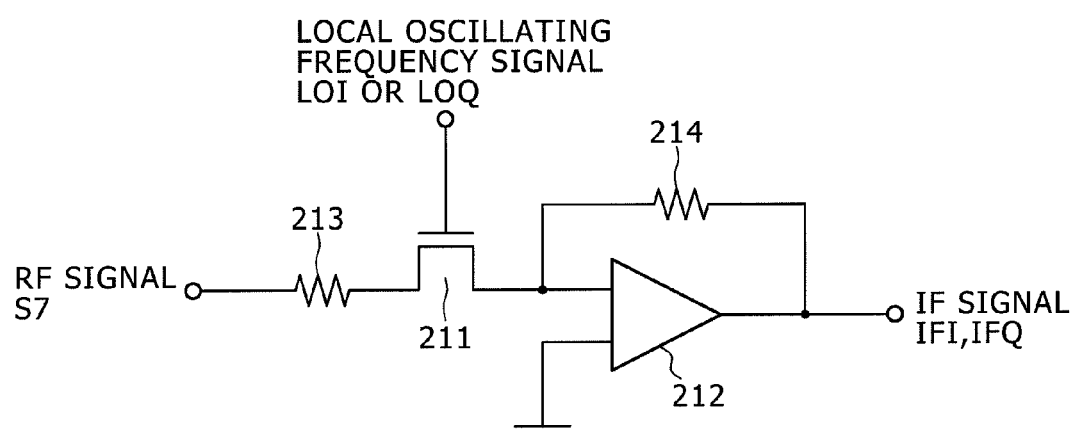
FIG. 4 is a diagram showing an example of circuit configuration of mixers forming a frequency converter circuit in FIG. 1.

FIG. 4 is a diagram showing an example of circuit configuration of the mixers 21 and 22.

As illustrated in FIG. 4, the mixers 21 and 22 within the frequency converter circuit 20 can each be formed as a passive type using a MOS transistor switch 211. Reference numeral 212 denotes an amplifier circuit, reference numeral 213 denotes an input resistive element, and reference numeral 214 denotes a feedback resistive element.

Thus forming the mixers 21 and 22 enables driving of the oscillator circuit 10 using a CMOS inverter and enables amplitude to be changed fully to a power supply voltage.

In this case, an amplitude error in local oscillation (LO) driving in the mixers 21 and 22 can be made extremely small, and the amplitude error may be considered to occur in the IF circuit system. Thus sufficiently effective use can be made of even the configuration of the receiver 100 illustrated in FIG. 1.

In other words, when the mixers 21 and 22 illustrated in FIG. 4 are used, sufficiently effective use can be made of the receiver 100 according to the first embodiment.

Second Embodiment

A second embodiment of the radio receiver according to the present invention will be described with reference to FIG. 5.

As has been considered in the foregoing first embodiment, a phase error can be considered to occur mainly in the second oscillator circuit 10A because of the high frequency. In this case, it is considered that the phase error changes depending on reception frequency, and thus adjustment needs to be performed for each reception frequency.

A receiver 100A according to the second embodiment includes a test signal generating circuit 50A enabling adjustment at an arbitrary reception frequency in order to eliminate the limitation in the receiver 100 according to the foregoing first embodiment.

[Constitution]

The radio receiver 100A according to the second embodiment of the present invention is different in terms of a circuit configuration of the test signal generating circuit 50A as compared with the radio receiver 100 according to the first embodiment described with reference to FIG. 1.

Other circuit configurations are basically similar to those of the radio receiver 100 illustrated in FIG. 1.

[Test Signal Generating Circuit]

Figure 5:
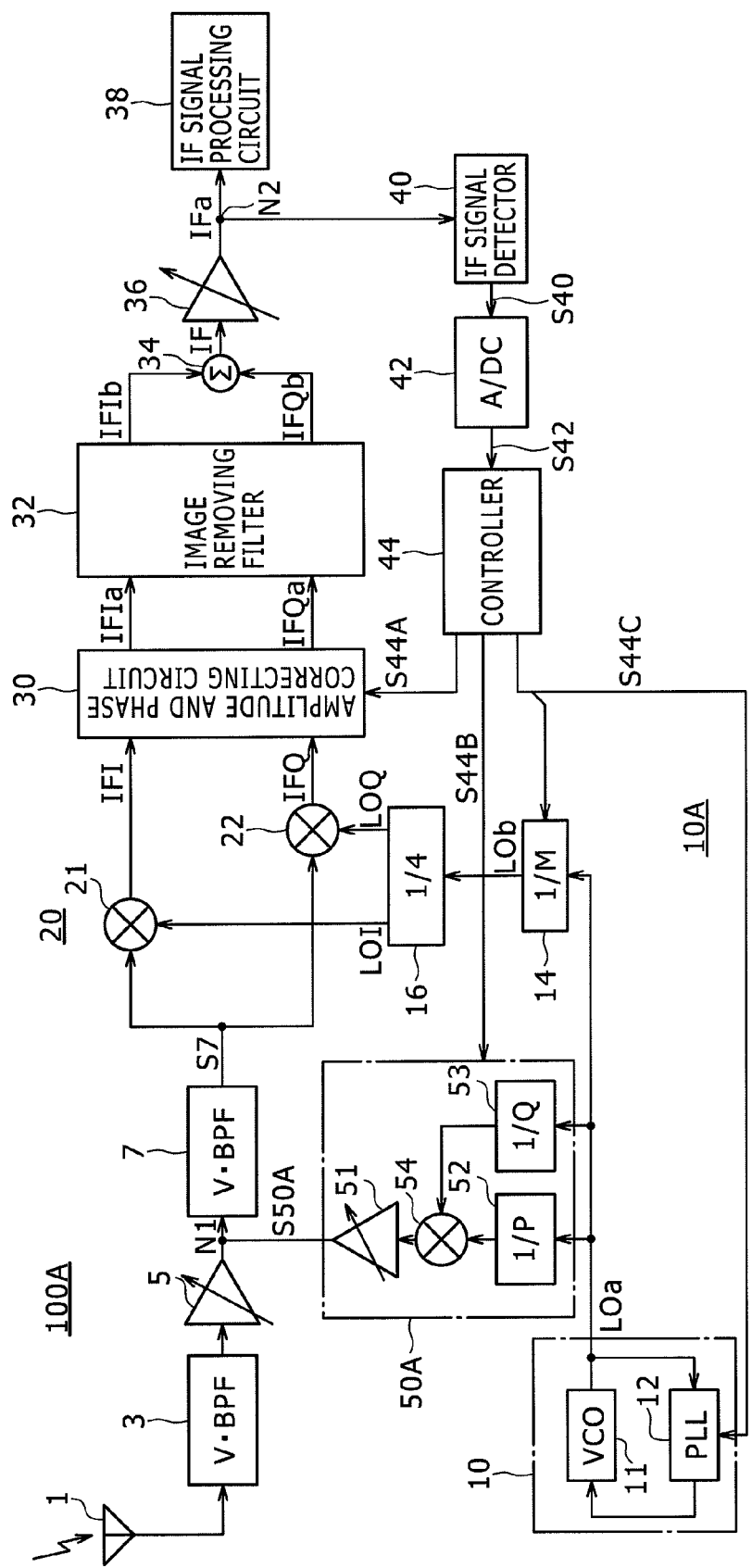
FIG. 5 is a block diagram of a radio receiver according to a second embodiment of the present invention.

The test signal generating circuit 50A illustrated in FIG. 5 includes a third gain-variable type low noise amplifier circuit (LNA) 51, a second frequency divider circuit 52, a third frequency divider circuit 53, and a first mixer 54 for generating a test signal.

A comparison with the test signal generating circuit 50 illustrated in FIG. 1 shows that the frequency divider circuit 53 with a frequency dividing factor of Q and the mixer 54 for generating a test signal are added.

The frequency divider circuit 52 with a frequency dividing factor of P and the low noise amplifier circuit (LNA) 51 are basically the same circuits as described with reference to FIG. 1.

The frequency dividing factor of P of the frequency divider circuit 52 and the frequency dividing factor of Q of the frequency divider circuit 53 are set as a control signal S44B from a controller 44.

In this case, a condition of P<Q is set for the frequency dividing factors of P and Q.

In the test signal generating circuit 50A, the frequency divider circuit 52 frequency-divides a first oscillating signal LO of a first local oscillation frequency $f_{VCO}$ which signal is generated in a first oscillator circuit 10 by the frequency dividing factor of P.

The frequency divider circuit 53 frequency-divides the first oscillating signal LO of the first local oscillation frequency $f_{VCO}$ which signal is generated in the first oscillator circuit 10 by the frequency dividing factor of Q.

The mixer 54 performs frequency conversion by multiplying together the frequency-divided signal of the frequency divider circuit 52 and the frequency-divided signal of the frequency divider circuit 53.

The low noise amplifier circuit (LNA) 51 amplifies an output signal of the mixer 54, and thereby generates a test signal S50A. The low noise amplifier circuit (LNA) 51 applies the test signal S50A to a node N1. The low noise amplifier circuit (LNA) 51 thus injects (superimposes) the test signal S50A into an RF signal.

Figure 6:
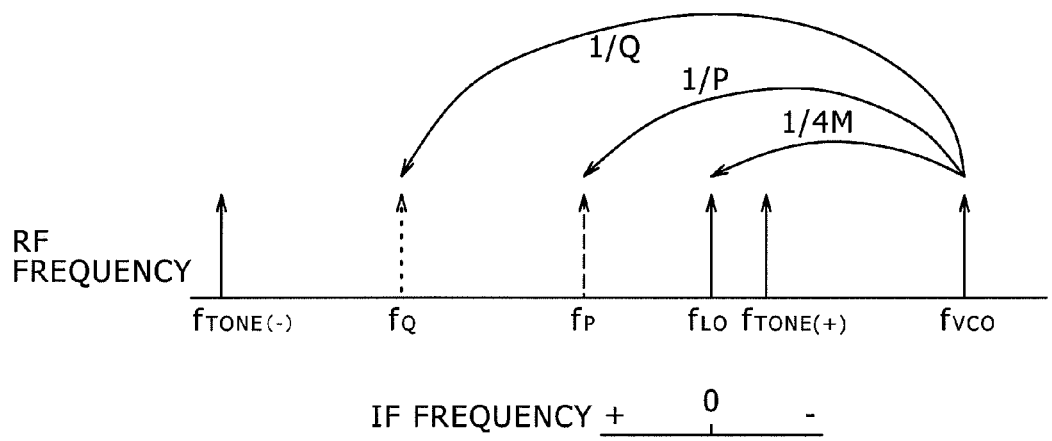
FIG. 6 is a graph obtained by plotting a second local oscillation frequency $f_{LO}$ and the tone frequency $f_{TONE}$ of a test signal when the frequency dividing factors of P and Q of two frequency divider circuits within a test signal generating circuit are changed in the second embodiment.

FIG. 6 is a graph obtained by plotting a local oscillation frequency $f_{LO}$ and a tone frequency $f_{TONE}$ when the first local oscillation frequency $f_{VCO}$ is changed and the frequency dividing factors of P and Q of the two frequency divider circuits 52 and 53 within the test signal generating circuit 50A are changed.

As described above, the frequency dividing factors of P and Q are set under the condition of P<Q.

A frequency-converted signal S54 generated in the mixer 54 and, in turn, the tone frequency $f_{TONE}$ of the test signal S50A include a signal of the following frequency $f_{TONE}(\pm)$ or $f_{TONE}(-)$.

$$f_{TONE}(+)=f_{VCO}(1/P+1/Q)$$

$$f_{TONE}(-)=f_{VCO}(1/P-1/Q)$$

The controller 44 sets the values of the frequency dividing factors of P and Q such that one of the frequencies $f_{TONE}(+)$ and $f_{TONE}(-)$ is the frequency of the test signal S50A.

When the values of the frequency dividing factors of P and Q are set such that the frequency $f_{TONE}(+)$ is an image frequency, a spectrum has a relation as illustrated in FIG. 6.

In this case, a divided frequency $f_P$ generated by the frequency divider circuit 52 and a divided frequency $f_Q$ generated by the frequency divider circuit 53 are $f_{VCO}/P$ and $f_{VCO}/Q$, respectively.

For example, consideration will be given to a combination in which the frequency dividing factor of P of the frequency divider circuit 52 is set to be a total of the frequency dividing factors of M and four of a frequency divider circuit 14 and a frequency divider and phase shifter 16, that is, P=4×M, and Q=substantially ($f_{VCO}/f_{IF}$), that is, Round ($f_{VCO}/f_{IF}$). That is, a case can be assumed in which the frequency divider circuit 52 with the frequency dividing factor of P generates a signal of the same frequency as the local oscillation frequency $f_{LO}$ and the frequency divider circuit 53 with the frequency dividing factor of Q generates a signal of the same frequency as an IF frequency $f_{IF}$.

However, this method makes a signal of the same reception frequency itself as the image frequency, and thus cannot be used for image adjustment. However, the method can be used for adjustment of a tracking filter, that is, variable band-pass filters 3 and 7 and a gain-variable type low noise amplifier circuit 5. This will be described later.

From the above, as a combination of the frequency dividing factors of P and Q in the test signal generating circuit 50A, the frequency dividing factors of P and Q need to be selected such that when one of the frequencies $f_{TONE}(+)$ and $f_{TONE}(-)$ is the image frequency, the other is not the reception frequency, that is, a frequency that does not interfere with image adjustment.

Combinations of the frequency dividing factors of P and Q will be considered assuming a case where the radio receiver 100A illustrated in FIG. 5 is used as a terrestrial television receiver. Incidentally, though the frequency dividing factors of P and Q are usually an integer, half-integer frequency dividing factors and frequency dividing ratios of (½) will also be considered.

Concrete examples will be illustrated in the following.

When the first local oscillation frequency $f_{VCO}$ is 3200 MHz, the frequency dividing factor of M of the frequency divider circuit 14 is set at M=1. When the reception frequency $f_{RF}$ is 796 MHz, and the IF frequency $f_{IF}$ is 4 MHz, the tone IF frequency $f_{TONE}$ of the test signal S50A is 804 MHz.

It suffices for the frequency of the test signal S50A to be within an IF band. Therefore it suffices for the tone IF frequency $f_{TONE}$ to be within a range of 801 to 809 MHz.

The frequency dividing factors of M, P, and Q are set at M=1, P=5, and Q=19.5. Hereinafter, the relation between the frequency dividing factors of M, P, and Q will be simplified, and the combination of the frequency dividing factors will be denoted as [M, P, Q]. In this case, the frequency dividing factors of M, P, and Q set at M=1, P=5, and Q=19.5 are written as [1, 5, 19.5].

$$f_{TONE}(+)=3200(1/5+1/19.5)=804.10 \text{ MHz}$$

$$f_{TONE}(-)=3200(1/5-1/19.5)=475.90 \text{ MHz}$$

The frequency $f_{TONE}(+)$ can be applied as the frequency of the test signal S50A for image adjustment.

The frequency $f_{TONE}(-)$ is sufficiently separated from the image frequency, and does not interfere with image adjustment.

Figure 7:
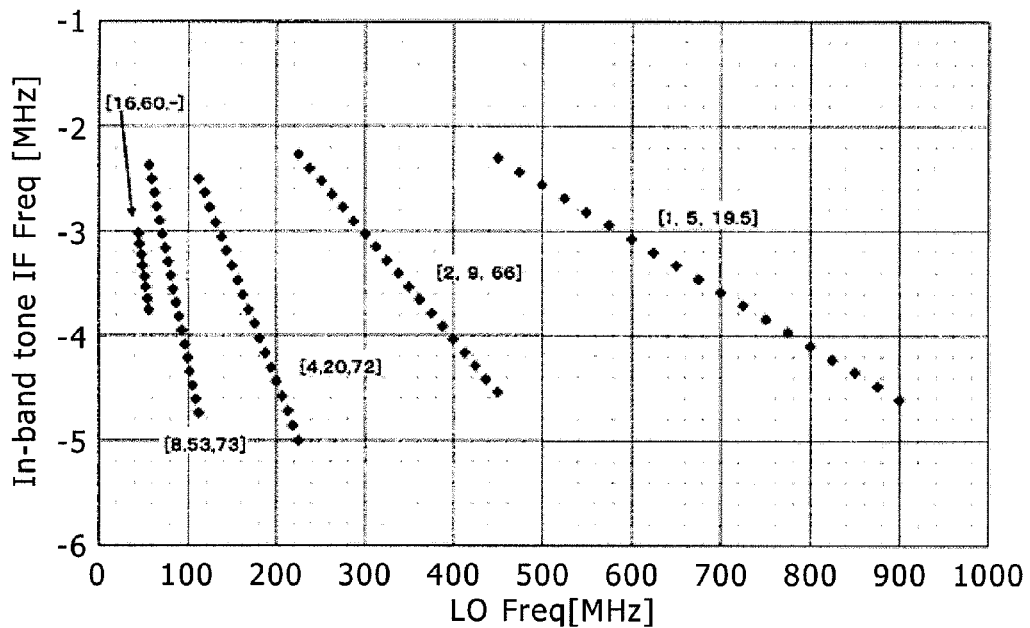
FIG. 7 is a graph obtained by plotting possible combinations of the frequency dividing factors [P, Q] of the two frequency divider circuits within the test signal generating circuit when reception frequency is set at 40 to 900 MHz in the upper local system in the second embodiment.

FIG. 7 is a graph obtained by discretely plotting the local oscillation frequency $f_{VCO}$ in units of 100 MHz for possible combinations of the frequency dividing factors [P, Q] when the reception frequency is set at 40 to 900 MHz. In FIG. 7, as described above, [1, 5, 19.5], for example, denotes a combination [M, P, Q] of the frequency dividing factors.

An axis of abscissas indicates the local oscillation frequency $f_{VCO}$, and an axis of ordinates indicates the IF tone frequency $f_{IF\text{-}TONE}$.

In practice, the absolute value of the IF tone frequency $f_{IF\text{-}TONE}$ is observed in the IF signal.

In a region where the frequency dividing factor of M of the frequency divider circuit 14 is M=2 or more, combinations of the frequency dividing factors of P and Q have a certain degree of freedom. Thus there are combinations of the frequency dividing factors of P and Q other than those illustrated in FIG. 7.

Figure 8:
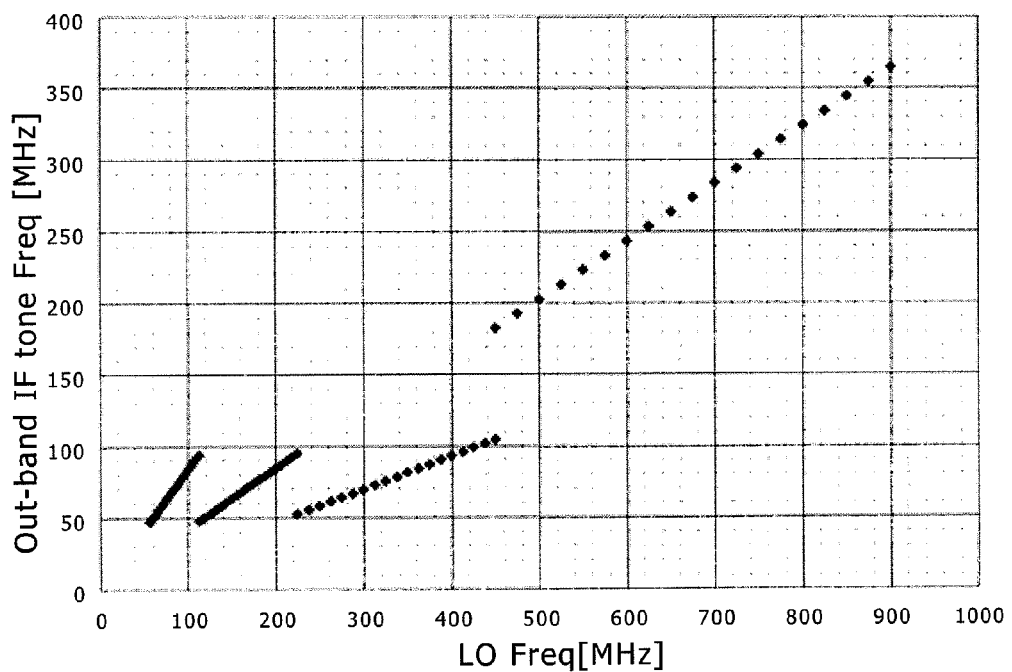
FIG. 8 is a graph obtained by plotting the tone frequency $f_{TONE}(-)$ of a test signal in the case illustrated in FIG. 7 by IF frequency.

FIG. 8 is a graph obtained by plotting the frequency $f_{TONE}(-)$ by IF frequency.

It is understood that the frequency $f_{TONE}(-)$ is considerably separated from an IF frequency band, and does not affect image adjustment.

Also in the low local system, a desirable image signal can be generated in a similar manner to the above.

Figure 9:
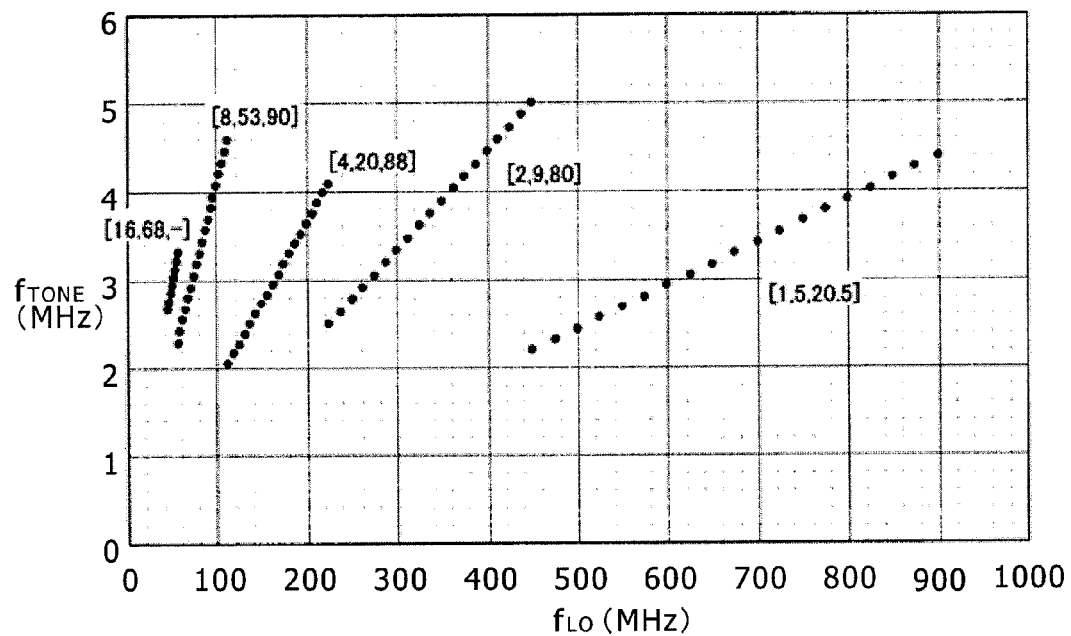
FIG. 9 is a graph showing an example of generation of an image signal in the low local system, the graph corresponding to FIG. 7.

FIG. 9 is a graph showing an example of generation of an image signal in the low local system, the graph corresponding to FIG. 7. In FIG. 9, as described above, [1, 5, 20.5], for example, denotes a combination [M, P, Q] of the frequency dividing factors.

Figure 10:
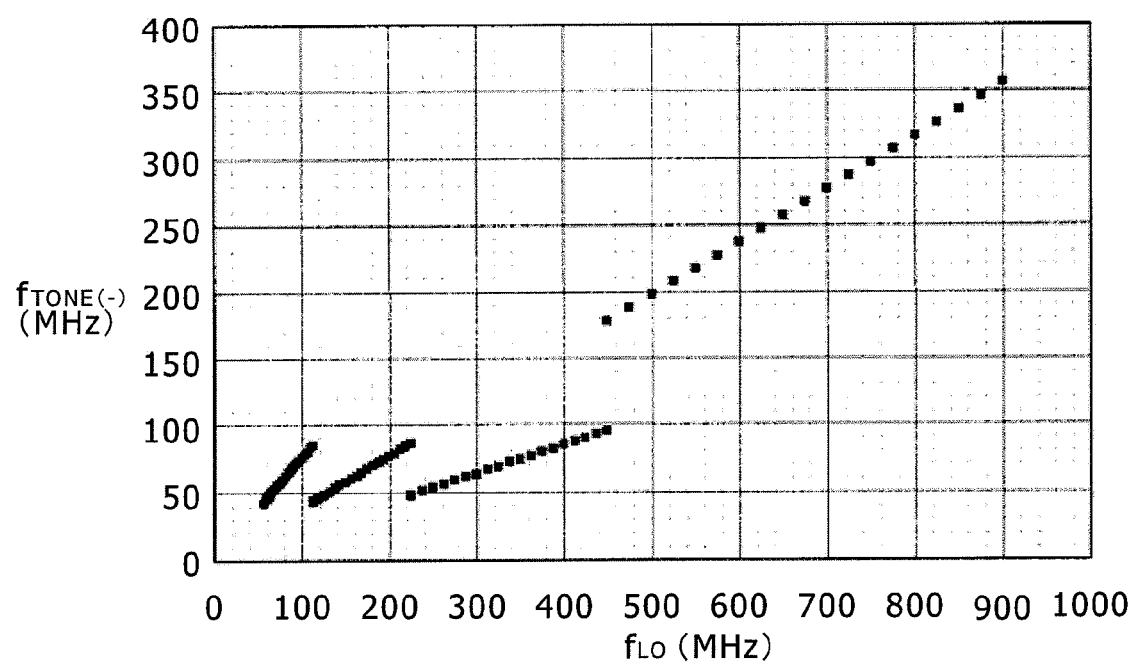
FIG. 10 is a graph obtained by plotting relation between the tone frequency $f_{TONE}(-)$ of a test signal and IF frequencies in the low local system in the case illustrated in FIG. 9, the graph corresponding to FIG. 8.

FIG. 10 is a graph obtained by plotting the frequency $f_{TONE}(-)$ in the low local system by IF frequency in the case illustrated in FIG. 9, the graph corresponding to FIG. 8.

Illustrations of FIG. 9 and FIG. 10 show that a desirable image signal can be generated also in the low local system by setting the frequency dividing factors of P and Q appropriately.

As described above, a test signal S50A desirable for image adjustment can be generated when the radio receiver 100A according to the second embodiment is used and a combination of the frequency dividing factors of M, P, and Q in the frequency divider circuit 14 and the frequency divider and phase shifter 16 within the second oscillator circuit 10A and the frequency divider circuits 52 and 53 within the test signal generating circuit 50A is set appropriately.

Of course, in the radio receiver 100A, the combination of the frequency dividing factors of M, P, and Q is not unique, but can be selected variously and arbitrarily. As a result, the test signal S50A having various tone frequencies $f_{TONE}$ can be generated.

Incidentally, the above-described combinations of the frequency dividing factors of M, P, and Q can be realized by setting the frequency dividing factors of the frequency divider circuit 14 and the frequency divider circuits 52 and 53 in the controller 44.

For this, the memory of the controller 44 stores for example a desirable combination of the frequency dividing factors of M, P, and Q for each channel frequency, so that a desirable combination of the frequency dividing factors of M, P, and Q can be set according to a selected channel.

Third Embodiment

A third embodiment of the receiver according to the present invention will be described with reference to FIG. 11.

A radio receiver 100B according to the third embodiment further extends selectivity of the frequency dividing factor of the radio receiver 100A according to the second embodiment.

[Constitution]

The radio receiver 100B according to the third embodiment of the present invention is different in terms of a circuit configuration of a test signal generating circuit 50B as compared with the radio receiver 100A according to the second embodiment described with reference to FIG. 5.

Other circuit configurations are basically similar to those of the receivers 100 and 100A illustrated in FIG. 1 and FIG. 5.

[Test Signal Generating Circuit]

Figure 11:
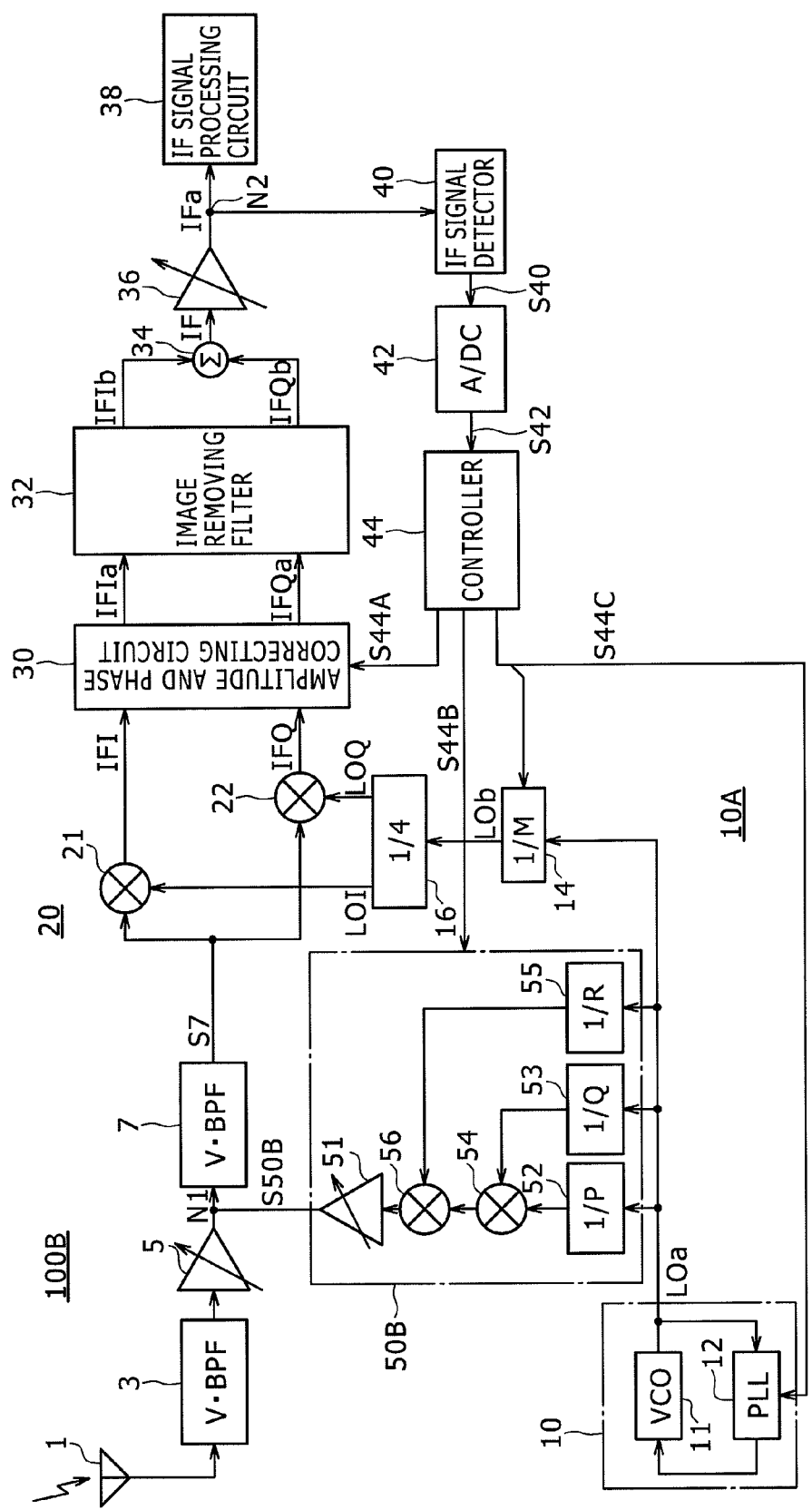
FIG. 11 is a block diagram of a radio receiver according to a third embodiment of the present invention.

The test signal generating circuit 50B illustrated in FIG. 11 includes a third gain-variable type low noise amplifier circuit (LNA) 51, a second frequency divider circuit 52, a third frequency divider circuit 53, a first mixer 54 for generating a test signal, a fourth frequency divider circuit 55, and a second mixer 56 for generating the test signal.

A comparison with the test signal generating circuit 50A illustrated in FIG. 5 shows that the frequency divider circuit 55 and the mixer 56 are added to the test signal generating circuit 50B.

The frequency divider circuit 52 with a frequency dividing factor of P, the frequency divider circuit 53 with a frequency dividing factor of Q, the mixer 54, and the LNA 51 are basically the same circuits as described with reference to FIG. 5.

The frequency dividing factor of P of the frequency divider circuit 52, the frequency dividing factor of Q of the frequency divider circuit 53, and the frequency dividing factor of R of the frequency divider circuit 55 are set as a control signal S44B by a controller 44.

The frequency divider circuits 52, 53, and 55 frequency-divide a first local oscillation frequency $f_{VCO}$ by the frequency dividing factors of P, Q, and R, respectively.

Letting $f_P = f_{VCO}/P$, $f_Q = f_{VCO}/Q$, and $f_R = f_{VCO}/R$ be the frequencies divided by the frequency divider circuits 52, 53, and 55, respectively, an output signal of the mixer 56, that is, a test signal S50B in effect, includes the following frequency component (tone frequency component).

$$f_{TONE}(\pm) = f_P(\pm) f_Q(\pm) f_R$$

It suffices to select the frequency dividing factors of P, Q, and R so that the test signal S50B having one of these tone frequencies as tone frequency is selected.

As an example of this, a case where the frequency dividing factors of P, Q, and R are selected such that the following frequency $f_{TONE}(--)$ is an image frequency will be described.

$$f_{TONE}(--) = f_P f_Q f_R$$

Figure 12:
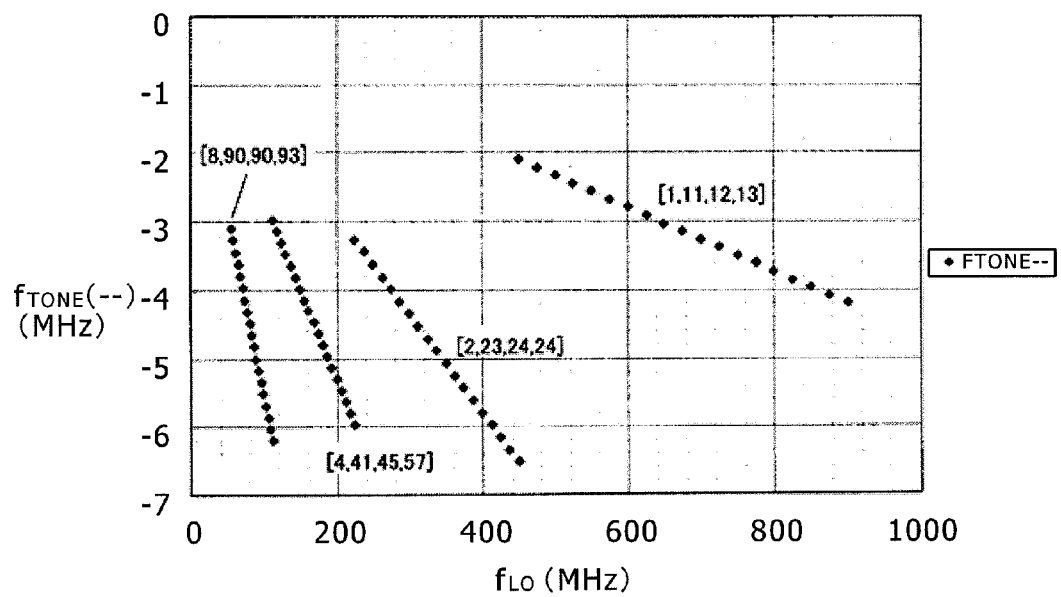
FIG. 12 is a graph obtained by plotting relation between the tone frequency $f_{TONE}(--)$ of a test signal and IF frequencies in the third embodiment.

FIG. 12 is a graph obtained by plotting the tone frequency $f_{TONE}(--)$ in the third embodiment by IF frequency.

It is understood that the frequency $f_{TONE}(--)$ is considerably separated from an IF frequency band, and does not affect image adjustment.

In FIG. 12, [1, 11, 12, 13], for example, denotes a combination of the frequency dividing factors of M, P, Q, and R.

It is to be understood that there are various combinations of the frequency dividing factors of M, P, Q, and R for realizing a tone frequency separated from the image frequency.

Thus, various other combinations of the frequency dividing factors of M, P, Q, and R are possible without being limited to this illustration. When the frequency dividing factor of M in a frequency divider circuit 14 is M=1, for example, [1, 6, 22, 26], [1, 7, 26, 22], and [1, 8, 13, 20], for example, can be adopted.

As in the second embodiment, according to a selected channel, the controller 44 sets a combination of the frequency dividing factors of M, P, Q, and R for realizing the above-described tone frequency in the frequency divider circuit 14 and the frequency divider circuits 52, 53, and 55 within the test signal generating circuit 50B.

The following frequencies other than the above-described frequency $f_{TONE}(--)$ are spurious frequencies.

Figure 13:
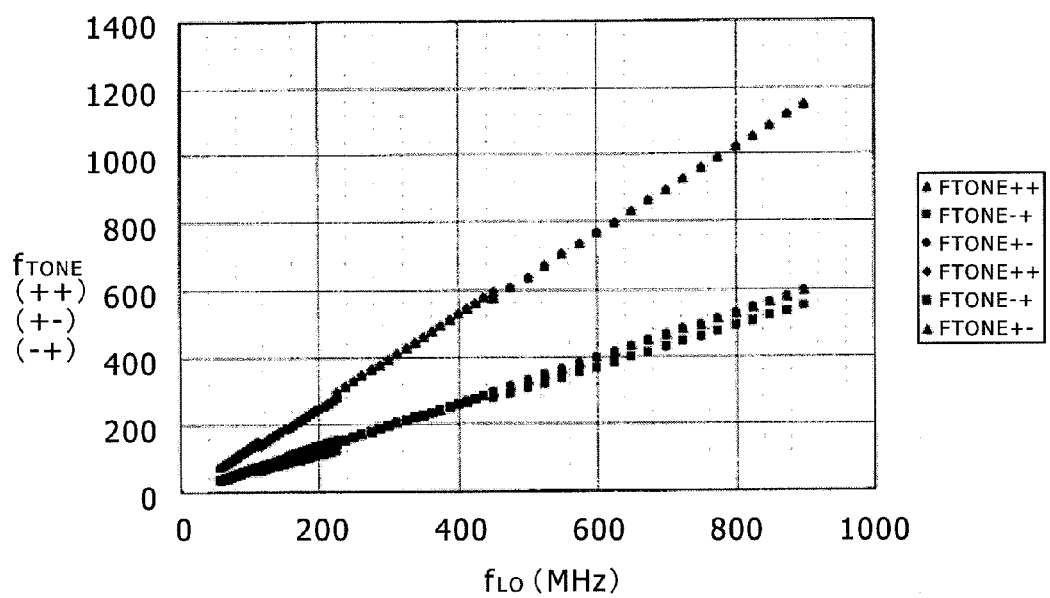
FIG. 13 is a graph illustrating spurious tone frequencies $f_{TONE}$ and obtained by plotting relation between the tone frequencies $f_{TONE}$ and IF frequencies.

FIG. 13 is a graph obtained by plotting the spurious tone frequencies for reference.

$$f_{TONE}(++), f_{TONE}(+-)$$

$$f_{TONE}(-+) = f_P f_Q f_R$$

$$f_{TONE}(+-) = f_P f_Q f_R$$

Figure 14:
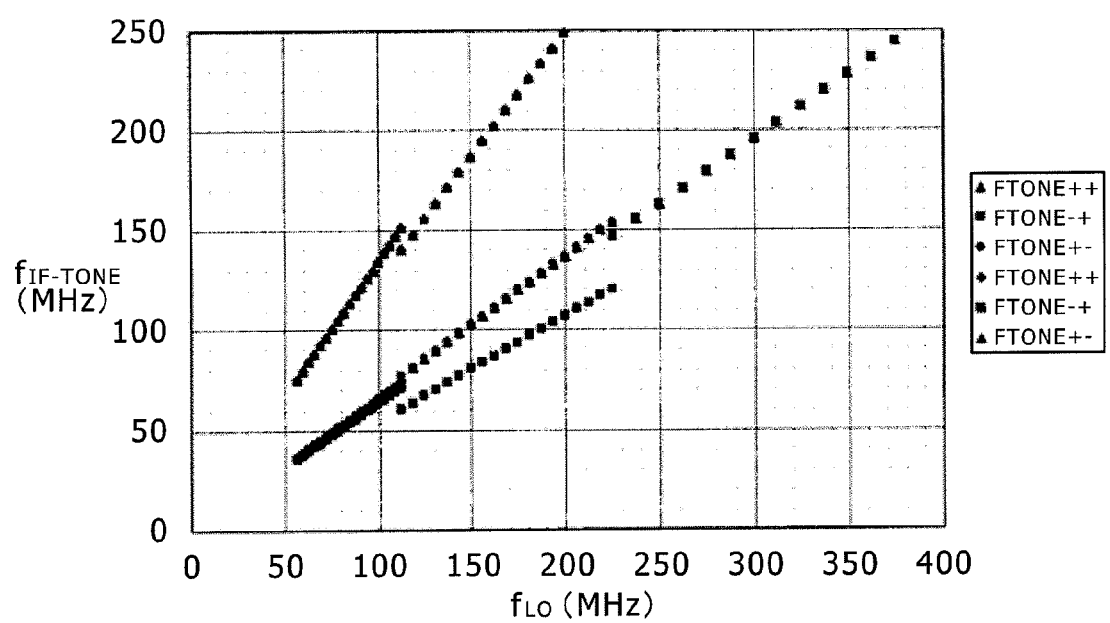
FIG. 14 is a diagram showing the characteristics illustrated in FIG. 13 in an enlarged state at local oscillation frequency $f_{VCO}=400$ MHz or lower.

FIG. 14 is a diagram showing the characteristics illustrated in FIG. 13 in an enlarged state at the first local oscillation frequency $f_{VCO} = 400$ MHz or lower.

Fourth Embodiment

Figure 15:
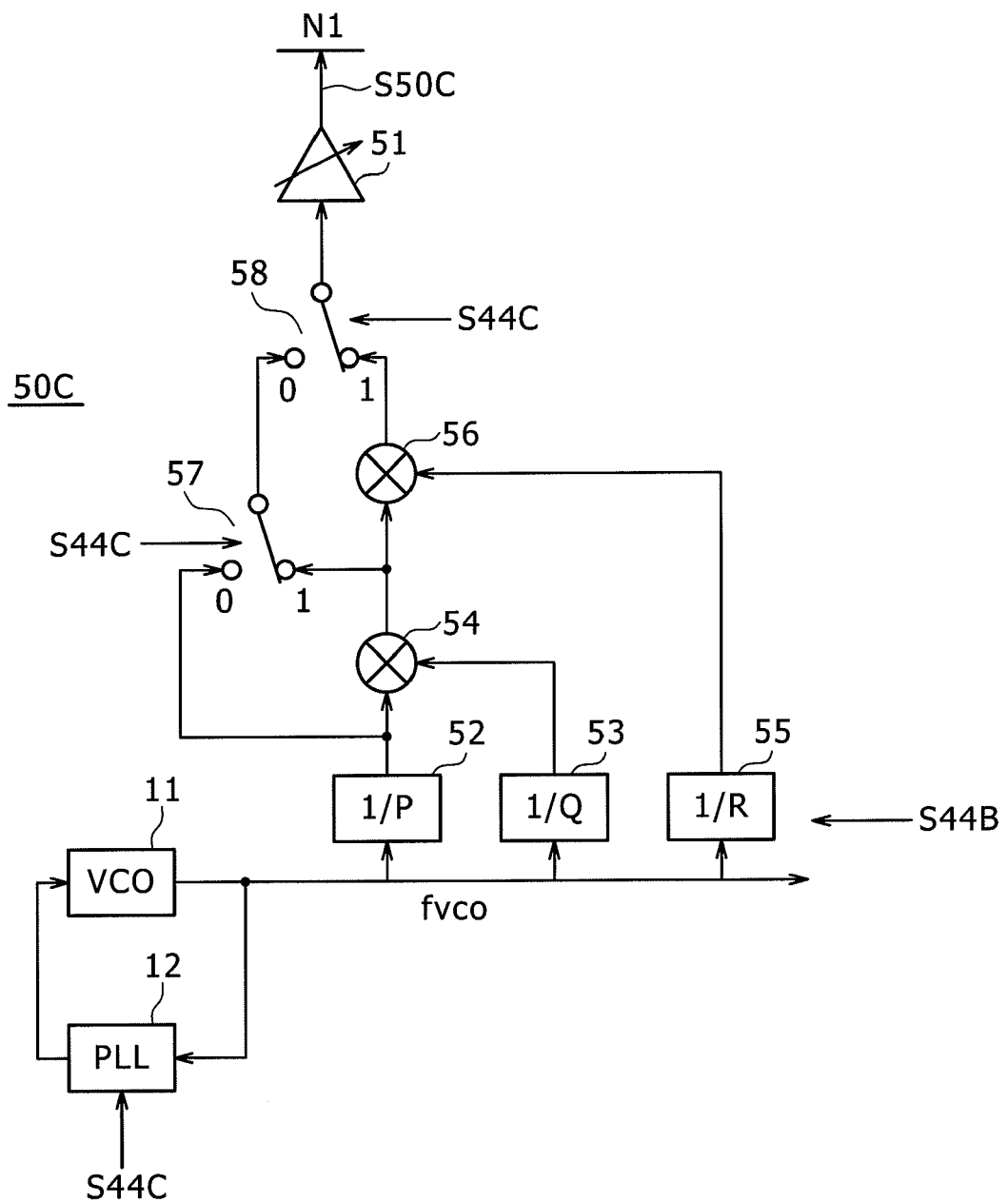
FIG. 15 is a diagram showing a circuit configuration of a test signal generating circuit in a receiver according to a fourth embodiment of the present invention.

FIG. 15 is a diagram showing a circuit configuration of a test signal generating circuit 50C in a receiver according to a fourth embodiment of the present invention.

As described in the first to third embodiments, a difference in configuration of the receiver is the test signal generating circuit. Thus, as a fourth embodiment, only the test signal generating circuit 50C is illustrated, and the illustration of other configurations will be omitted.

The test signal generating circuit 50C illustrated in FIG. 15 enables the connections between the mixers 54 and 56 and the frequency divider circuit 52, which form the test signal generating circuit 50B in the receiver 100B according to the third embodiment described with reference to FIG. 11, to be changed for example by a control signal S44B from a controller 44 using a first switch 57 and a second switch 58.

For example, when the controller 44 energizes the switch 58 to a contact "1" side by the control signal S44B, a signal resulting from an output of a frequency divider circuit 55 with a frequency dividing factor of R being applied to the mixer 56 and thus subjected to frequency conversion is output to a node N1 via an LNA 51. When the controller 44 conversely energizes the switch 58 to a contact "0" side and energizes the switch 57 to a contact "1" side by the control signal S44B, a signal frequency-divided by a frequency divider circuit 53 with a frequency dividing factor of Q and frequency-converted by the mixer 54 is output to the node N1 via the LNA 51.

In this circuit example, because the two switches 57 and 58 are provided, a test signal S50C of the following tone frequencies can be output to the node N1 according to the state of operation of the switches 57 and 58.

TABLE 1

| | SWITCH 57 | SWITCH 58 | TONE FREQUENCY |
|---|---|---|---|
| (1) | "0" POSITION | "0" POSITION | $f_P$ |
| (2) | "0" POSITION | "1" POSITION | $f_P (\pm) f_Q (\pm) f_R$ |
| (3) | "1" POSITION | "0" POSITION | $f_P (\pm) f_Q$ |
| (4) | "1" POSITION | "1" POSITION | $f_P (\pm) f_Q (\pm) f_R$ | where $f_P = f_{VCO}/P$, $f_Q = f_{VCO}/Q$, and $f_R = f_{VCO}/R$

The radio receiver using the test signal generating circuit 50C described with reference to FIG. 15 has an advantage of extending a degree of freedom of selection of the tone frequency of the test signal S50C for the combination of the frequency dividing factors by only adding the switches 57 and 58 as compared with the receiver 100B according to the third embodiment.

[Example of Configuration of Half-integer Frequency Divider Circuit]

An example of configuration of a half-integer frequency divider circuit included in the frequency divider circuits of the above-described receivers will be described.

As a frequency divider circuit, a frequency divider circuit performing frequency division with a power of (½) has a simple circuit configuration. For example, a (½) frequency divider circuit can be formed by one delay type (D-type) flip-flop. It therefore suffices to cascade DFFs.

On the other hand, a half-integer frequency divider circuit has a somewhat more complex configuration.

A suitable half-integer frequency divider circuit to which an embodiment of the present invention is applied will be described.

Incidentally, a test signal S50 needs to have a large power component of the frequency itself (fundamental) of the test signal S50. That is, the duty ratio of the test signal needs to be not so far from 50%.

A method using a programmable counter (for example a k-counter 201 in FIG. 16) to make the duty ratio close to 50% by an ordinary (1/N) frequency division is known.

The programmable counter first performs frequency division by a frequency dividing factor N1=Floor/(N/2), and next performs frequency division by a frequency dividing factor N2=(N−N1). When the output signal is further subjected to (½) frequency division, a frequency-divided signal having a duty ratio of N1:N2 is obtained.

A swallow type counter suitable for high-speed operation can be preferably used as such a programmable counter.

Figure 16:
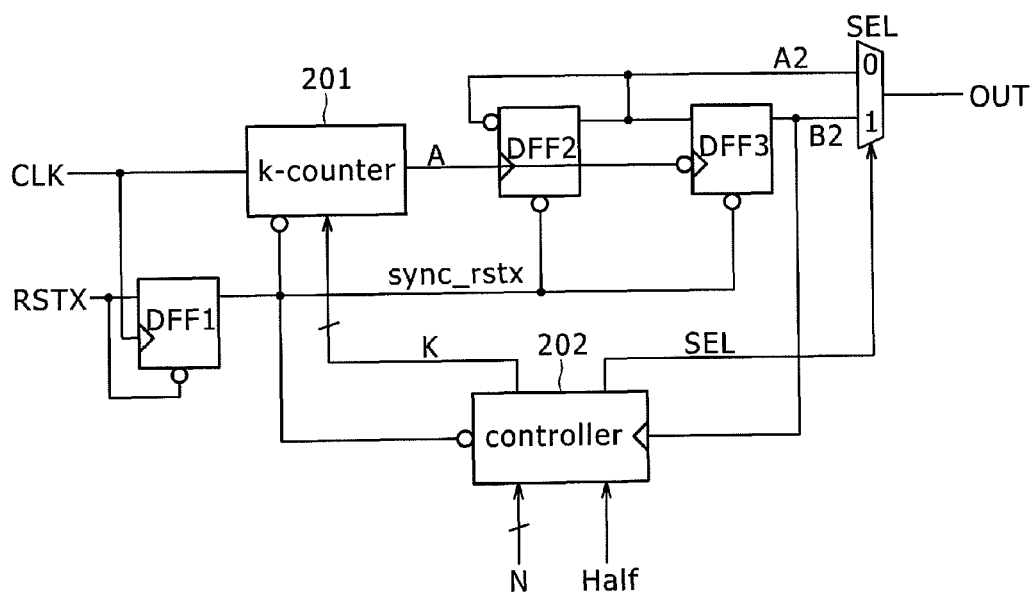
FIG. 16 is a diagram showing an example of circuit configuration of a half-integer frequency divider circuit used as a frequency divider circuit in the radio receiver according to the fourth embodiment.

FIG. 16 is a diagram showing an example of circuit configuration of a half-integer frequency divider circuit 200.

The half-integer frequency divider circuit 200 includes first to third delay type flip-flops DFF1 to DFF3, a k-counter 201 as a programmable counter, a counter controller 202, and a selector 203.

The k-counter 201 as a programmable counter can be formed as a swallow type counter suitable for high-speed operation. Details of the swallow type counter will be described later with reference to FIG. 22.

The delay type flip-flops DFF1 and DFF2 operate on a rising edge of a clock. The delay type flip-flop DFF3 operates on a falling edge of a clock.

A clock CLK is input to the k-counter 201 and the delay type flip-flop DFF1. A reset signal RSTX is input to the reset terminal of the delay type flip-flop DFF1.

A synchronizing reset signal sync-rstx is applied from the delay type flip-flop DFF1 to the reset terminals of the delay type flip-flops DFF2 and DFF3.

The counter controller 202 is supplied with a frequency dividing factor of N and a signal "half" indicating an integer frequency dividing factor or a half-integer frequency dividing factor. A coefficient k is output from the counter controller 202 to the k-counter 201. An output selecting signal SEL is output from the counter controller 202 to the selector 203.

Basic operation of the half-integer frequency divider circuit 200 at various frequency dividing factors will be described in the following.

Figure 17:
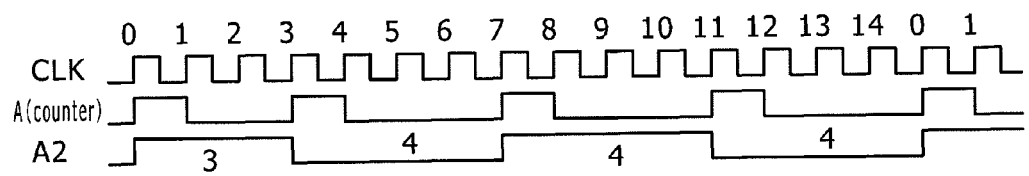
FIG. 17 is a timing chart of operation of a programmable counter with a frequency dividing factor of N=7.

FIG. 17 is a timing chart of operation of the swallow type counter with the frequency dividing factor of N=7.

The output signal of the k-counter 201 is usually a pulse of a short pulse width (length of one cycle of the input clock in this case). It is therefore difficult to make the duty ratio close to 50% except for a case of the frequency dividing factor of N=2, for example.

Accordingly, in this example, frequency division into ⅓ is performed by a frequency dividing factor of N1=Floor/(7/2)=3, and then frequency division into (¼) is performed by a frequency dividing factor of N2=N−N1=7−3=4. The output signal is shown as "A" in FIG. 17.

When the signal A is toggled at rising edges, frequency division into (½) can be performed. As a result, a signal frequency-divided into (⅛) is obtained.

The signal is shown as A2 in FIG. 17.

As is understood from the above description, by setting the frequency dividing factor of k of the k-counter 201 for each cycle of N1 and N2, a frequency-divided clock having a duty ratio close to 50% can be obtained.

When the frequency dividing factor of N is an even number, the setting of the frequency dividing ratio of the k-counter 201 can be fixed as (N/2).

Figure 18:
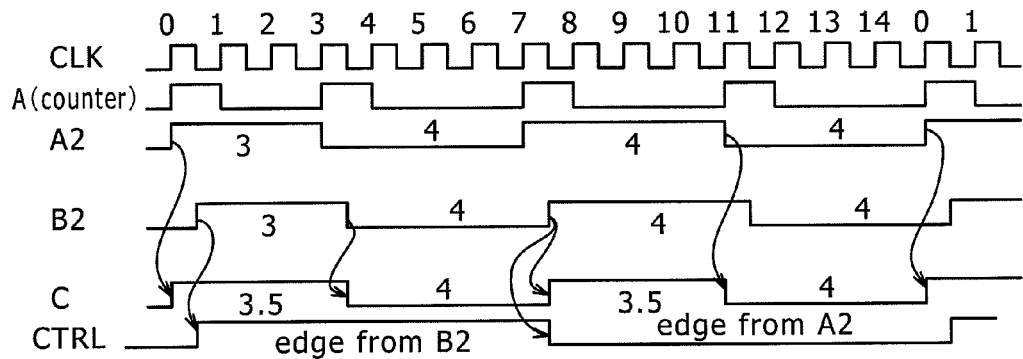
FIG. 18 is a timing chart of operation of a programmable counter with a frequency dividing factor of N=7.5.

FIG. 18 is a timing chart of operation of the swallow type counter with the frequency dividing factor of N=7.5.

The setting of the frequency dividing factor of the programmable counter repeats N1=[3, 4, 4, 4].

A signal A2 is obtained by frequency-dividing a counter output A into (½) as in the case of N=7. A signal B2 is obtained by delaying the signal A2 by half a cycle of the input clock.

The counter controller 202 supplies the selector 203 with the output selecting signal SEL indicating whether to select the signal A2 in synchronism with a rising edge of the signal B2 or to select the signal B2. In this example, switching is performed so as to output the signal B2 while SEL=1 and output the signal A2 while SEL=0. The output is OUT.

The duty ratio is [3.5:4].

To generalize, when N=2m+1+0.5 (where m is an integer), it suffices to set m=3 and (m+1)=4 in the illustration of FIG. 18.

Figure 19:
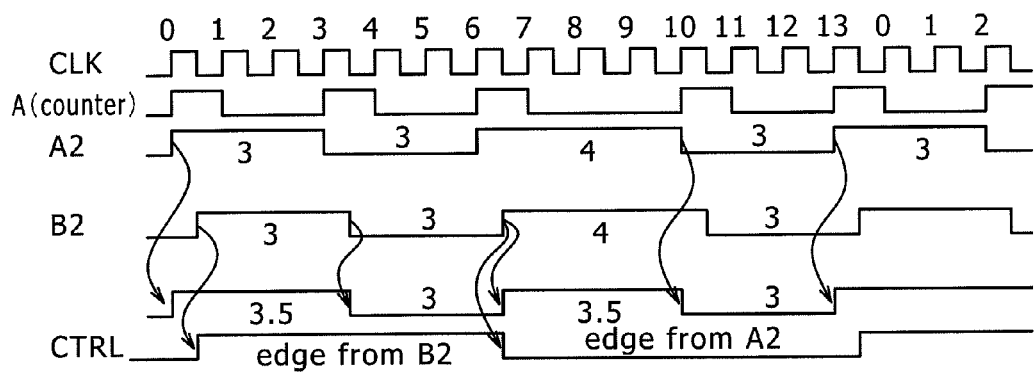
FIG. 19 is a timing chart of operation of a programmable counter with a frequency dividing factor of N=6.5.

FIG. 19 is a timing chart of operation of the swallow type counter with the frequency dividing factor of N=6.5.

Description will be made of N=6.5 as an example of N=2m+0.5 (where m is an integer).

While the operation of the swallow type counter with the frequency dividing factor of N=6.5 is basically similar to the operation described with reference to FIG. 17, the setting of the counter is [3, 3, 4, 3].

Figures 20, 21:
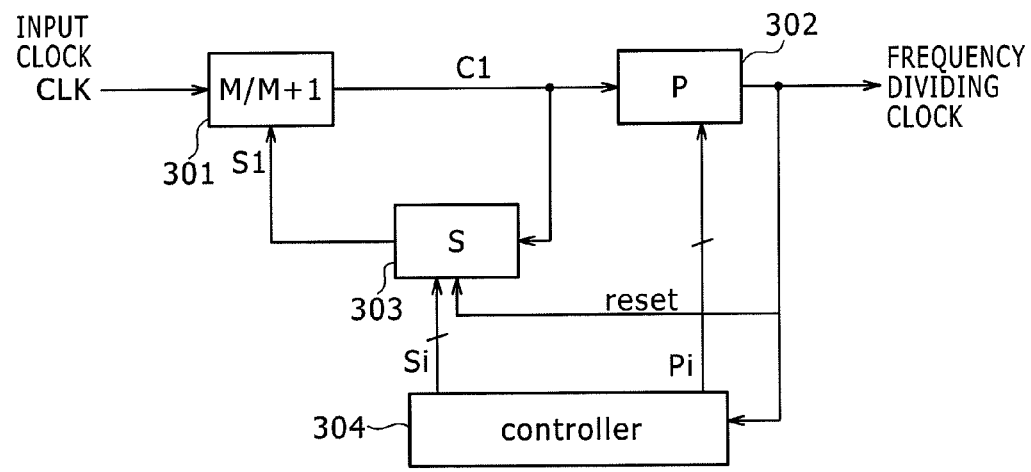
FIG. 20 is a table showing modes of operation of a counter controller illustrated in FIG. 16.
FIG. 21 is a circuit diagram showing an example of circuit configuration of a programmable counter suitable as a k-counter in the half-integer frequency divider circuit illustrated in FIG. 16.

FIG. 20 is a table showing modes of operation of the counter controller 202.

The counter controller 202 controls the k-counter 201 and the selector 203 under conditions shown in FIG. 20 according to the signal "half" indicating whether the frequency dividing factor of N is an integer frequency dividing factor or a half-integer frequency dividing factor.

When the signal "half" is "1," the signal "half" indicates a half-integer frequency dividing factor. When the signal "half" is "0," the signal "half" indicates an integer frequency dividing factor.

[Programmable Counter]

FIG. 21 is a circuit diagram showing an example of circuit configuration of a swallow type counter 300 as a programmable counter suitable as the k-counter 201 in the half-integer frequency divider circuit 200.

The swallow type counter 300 includes a dual modulus frequency divider circuit 301, a P-counter 302, an S-counter 303, and a counter controller 304.

The dual modulus frequency divider circuit 301 frequency-divides an input clock CLK into (1/M) or [1/(M+1)] according to a control signal S1 from the S-counter 303.

The P-counter 302 and the S-counter 303 are an ordinary counter operating on an output clock Cl of the dual modulus frequency divider circuit 301.

A reset signal "reset" is a pulse signal output at a point in time that a counter number set in the P-counter 302 is completed, and is also an output signal of the pulse swallow type counter.

This output signal resets the P-counter 302 and the S-counter 303 to start counter operation from a beginning.

The P-counter 302 and the S-counter 303 take in respective counter values Pi and Si from the counter controller 304 in an initial state, and use these values in a next cycle. Therefore the counter values Pi and Si different for each cycle can be set.

The S-counter 303 sets the output signal S1 to "1," for example, in the initial state. When counting to the "counter number Si" set in the initial state, the S-counter 303 sets the output signal S1=0. The S-counter 303 retains the output value S1 until the reset signal "reset" output from the P-counter 302 arrives.

The P-counter 302 outputs the reset signal "reset" and also initializes the count of the P-counter 302 itself when counting to the "counter value Pi" set in the initial state.

Usually, Pi>Si. After initialization, the dual modulus frequency divider circuit 301 frequency-divides the input clock CLK into (1/M) over an Si cycle, and frequency-divides the input clock CLK into [1/(M+1)] in a subsequent (Pi−Si) cycle.

That is, an interval (frequency dividing factor) of N of the reset signal "reset" output from the P-counter 302 is as follows.

$$N = Si \times (M + 1) + (Pi - Si) \times M$$
$$= Pi \times M \times Si$$

That is, an arbitrary frequency dividing ratio can be obtained by changing the counter values Pi and Si.

It suffices only for the dual modulus frequency divider circuit 301 to operate at high speed in the swallow type counter 300.

Figure 22:
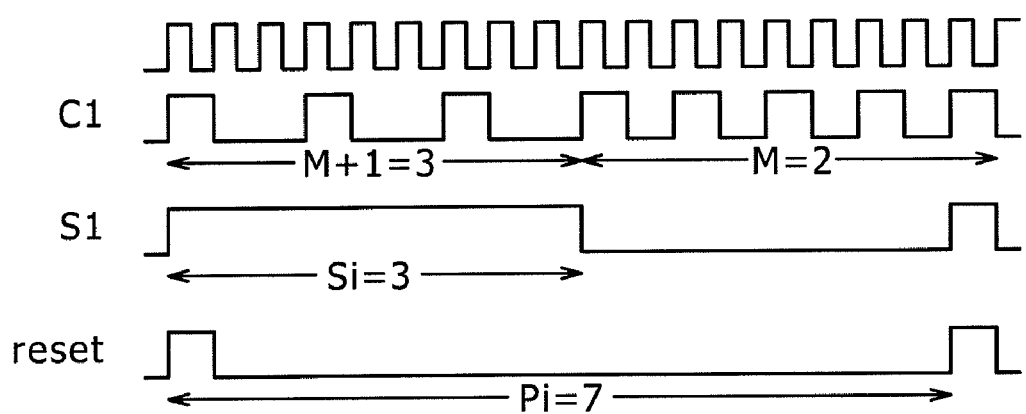
FIG. 22 is a diagram showing an example of operation timing of the swallow type counter illustrated in FIG. 21.

FIG. 22 is a diagram showing an example of operation timing of the swallow type counter 300 illustrated in FIG. 21.

This example represents a case where Si=3, Pi=7, and M=2. As a result, frequency dividing operation is performed with a frequency dividing factor of N=7×2+3=17.

Fifth Embodiment

Cases where a test signal is applied to the receivers 100, 100A, 100B, and 100C for image adjustment and examples of circuit configuration of the receivers have been illustrated above.

However, the test signal is not limited to the above-described uses for image adjustment, but is applicable to other cases.

As an illustration thereof, description will be made of for example a case where the test signal is used for a tracking filter and an RF amplifier.

Figure 23:
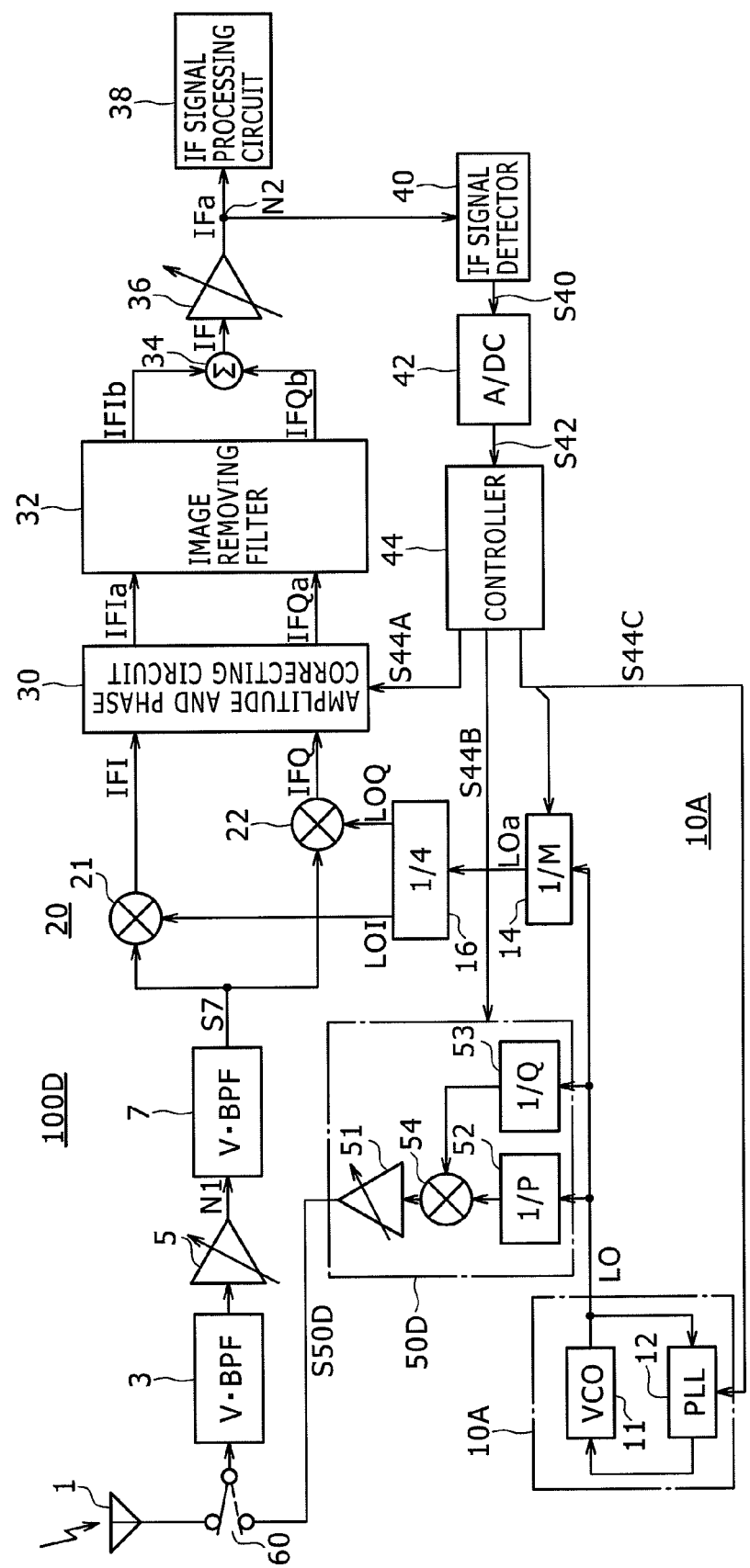
FIG. 23 is a block diagram of a radio receiver according to a fifth embodiment of the present invention.

FIG. 23 is a diagram showing an example of configuration of a receiver according to a fifth embodiment of the present invention.

The receiver 100D illustrated in FIG. 23 has a circuit configuration formed by adding a switch circuit 60 for switching between the antenna 1 and the test signal S50A in the receiver 100B according to the second embodiment described with reference to FIG. 5 and in which circuit configuration the test signal S50A is not applied to the node N1.

The circuit configuration of a test signal generating circuit 50D itself is the same as that of the test signal generating circuit 50A illustrated in FIG. 5.

The switch circuit 60 is changed by a controller 44, for example.

When the switch circuit 60 is changed to a state of a solid line shown in FIG. 23, a signal received by the antenna 1 is applied to a frequency converter circuit 20 via a variable band-pass filter 3, a gain-variable type low noise amplifier circuit 5, and a variable band-pass filter 7.

In this case, a test signal S50D is not injected.

When the switch circuit 60 is changed to a state of a broken line, the antenna 1 is disconnected, and the test signal S50D is applied to the frequency converter circuit 20 via the variable band-pass filter 3, the gain-variable type low noise amplifier circuit 5, and the variable band-pass filter 7. Thus, the test signal S50D can be prevented from being radiated from the antenna 1.

Incidentally, the upper local system or the low local system can be easily selected and used when an in-phase component local signal LOI and a quadrature component local signal LOQ are interchanged and supplied to the frequency converter circuit 20.

When switching between the upper local system and the low local system is performed for the test signal for image adjustment, the test signal S50D can be used as it is for adjustment of the tracking filter, that is, the variable band-pass filters 3 and 7 and the gain-variable type low noise amplifier circuit 5.

While the test signal generating circuit can assume the various circuit configurations described above, a configuration including at least two frequency divider circuits 52 and 53 and one mixer 54 as illustrated in FIG. 23 is desirable in order to generate an original test signal of a reception frequency accurately.

In this case, suppose that a frequency dividing factor of P in the frequency divider circuit 52 is (4×M), which is a total frequency dividing factor of a frequency divider circuit 14 and a frequency divider and phase shifter 16, so as to generate the same frequency as local oscillation frequency $f_{LO}$. That is, the frequency dividing factor of P is set at P=4M.

The frequency dividing factor of Q of the frequency divider circuit 53 is set at Q=Round($f_{VCO}/f_{IF}$) so that 1/Q provides a value as close to the center frequency $f_{IF}$ of IF frequency as possible.

At this time, the test signal S50D includes a reception frequency $f_{RF}$ and an image frequency $f_{IM}$.

An IMRR of about 30 dB is obtained without image adjustment by making circuit design carefully. Therefore an image signal in output of an IF signal is observed to be lower by about 30 dB than the reception frequency.

Thus, effects of the image frequency can be ignored by adjusting the tracking filter, that is, the variable band-pass filters 3 and 7 and the gain-variable type low noise amplifier circuit 5 in an IF band.

In carrying out the present invention, the present invention is not limited to the foregoing embodiments, and various modes of modification readily applicable by those skilled in the art can be adopted.

For example, the test signal generating circuit is not limited to the frequency divider circuits 52, 53, and 55 and the test signal generating frequency converter circuits 54 and 56 illustrated in FIG. 11. A larger number of frequency divider circuits and a large number of test signal generating frequency converter circuits corresponding to the larger number of frequency divider circuits can be provided. This increases a degree of freedom of frequency selection.

In addition, in a case where the numbers of frequency divider circuits and frequency converter circuits in a test signal generating circuit are increased, or even in a case where the numbers of frequency divider circuits and frequency converter circuits in a test signal generating circuit are not increased as illustrated in FIG. 15, connection relation between the frequency divider circuits and the frequency converter circuits can be changed using a large number of switches without limitation to the two switches illustrated in FIG. 15. This further increases the degree of freedom of frequency selection.

The present application contains subject matter related to that disclosed in Japanese Priority Patent Application JP 2008-272458 filed in the Japan Patent Office on Oct. 22, 2008, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. A radio receiver comprising:
   an oscillator circuit configured to generate an oscillating signal of a first oscillation frequency, the oscillator circuit including a phase-locked circuit and a voltage-controlled oscillator circuit;
   a first frequency divider circuit configured to generate a first oscillating signal and a second oscillating signal having a second oscillation frequency and orthogonal to each other by frequency-dividing said oscillating signal generated by said oscillator circuit by a first frequency dividing factor;
   a frequency converter circuit configured to generate a first intermediate frequency signal and a second intermediate frequency signal having an intermediate frequency and orthogonal to each other by multiplying a received radio frequency signal by the first oscillating signal and the second oscillating signal generated in said first frequency divider circuit and orthogonal to each other;
   a signal adding circuit configured to generate an intermediate frequency signal synthesized by adding together the first intermediate frequency signal and the second intermediate frequency signal generated in said frequency converter circuit and orthogonal to each other;
   a test signal generating circuit configured to generate a test signal by frequency-dividing the oscillating signal having said first oscillation frequency generated in said oscillator circuit by a second frequency dividing factor, and inject said test signal into said received radio frequency signal in an input section of said frequency converter circuit, the test signal generating circuit including at least one second frequency divider circuit; and
   controlling means for setting the first frequency dividing factor of said first frequency divider circuit and the second frequency dividing factor of said second frequency divider circuit according to a channel frequency.

2. The radio receiver according to claim 1, further comprising:
   a first band-pass filter configured to pass a band component of a first band-pass characteristic of said radio frequency signal received by an antenna;
   a high-frequency gain controlling type amplifier circuit configured to control a gain of an output signal of said first band-pass filter; and
   a second band-pass filter configured to pass a band component of a second band-pass characteristic of an output signal of said high-frequency gain controlling type amplifier circuit, and output the passed band component to said frequency converter circuit,
   wherein said test signal generated in said test signal generating circuit is injected into the output signal of said high-frequency gain controlling type amplifier circuit.

3. The radio receiver according to claim 2, wherein said test signal generating circuit has one frequency divider circuit, generates the test signal by frequency-dividing the oscillating signal having said first oscillation frequency generated in said oscillator circuit by a frequency dividing factor of said one frequency divider circuit, and injects said test signal into the output signal of said high-frequency gain controlling type amplifier circuit.

4. The radio receiver according to claim 2, wherein each of a first frequency converter circuit and a second frequency converter circuit configured to generate the first intermediate frequency signal and the second intermediate frequency signal having the intermediate frequency and orthogonal to each other by multiplying said received radio frequency signal by the first oscillating signal and the second oscillating signal generated in said first frequency divider circuit and orthogonal to each other has a mixer including a Metal Oxide Semiconductor transistor having a gate to which one of the first oscillating signal and the second oscillating signal is applied and having a source as an input terminal to which the radio frequency signal is applied.

5. The radio receiver according to claim 2,
   wherein said test signal generating circuit includes at least two frequency divider circuits and at least one frequency converter circuit,
   said at least two frequency divider circuits and said first frequency divider circuit each frequency-divide the oscillating signal having said first oscillation frequency generated in said oscillator circuit by a frequency dividing factor set from said controlling means, and
   said at least one frequency converter circuit within said test signal generating circuit generates said test signal by multiplying together signals frequency-divided by said at least two frequency divider circuits within said test signal generating circuit, and injects said test signal into the output signal of said high-frequency gain controlling type amplifier circuit.

6. The radio receiver according to claim 2,
   wherein said test signal generating circuit includes at least three frequency divider circuits and at least two frequency converter circuits,
   said at least three frequency divider circuits and said first frequency divider circuit each frequency-divide the oscillating signal having said first oscillation frequency generated in said oscillator circuit by a frequency dividing factor set from said controlling means, and
   said at least two frequency converter circuits within said test signal generating circuit generate said test signal by sequentially multiplying together signals frequency-divided by said at least three frequency divider circuits within said test signal generating circuit, and inject said test signal into the output signal of said high-frequency gain controlling type amplifier circuit.

7. The radio receiver according to claim 2,
   wherein said test signal generating circuit includes at least three frequency divider circuits, at least two frequency converter circuits, and a switch circuit capable of switch-changing connection relation between one of said frequency divider circuits within said test signal generating circuit and said frequency converter circuits within said test signal generating circuit, said at least three frequency divider circuits and said first frequency divider circuit each frequency-divide the oscillating signal having said first oscillation frequency generated in said oscillator circuit by a frequency dividing factor set from said controlling means, and said at least two frequency converter circuits within said test signal generating circuit generate said test signal by sequentially multiplying together signals passed through said switch circuit and frequency-divided by said at least three frequency divider circuits within said test signal generating circuit, and inject said test signal into the output signal of said high-frequency gain controlling type amplifier circuit.

8. The radio receiver according to claim 1, wherein when a frequency dividing factor of one of said frequency divider circuits is a half-integer frequency dividing factor, said frequency divider circuit includes:
a counter for counting a clock;
two delay type flip-flops for sequentially retaining an output signal of the counter, the two delay type flip-flops being cascaded;
one delay type flip-flop supplied with said clock and a reset signal;
a selector configured to select one of output signals of said two delay type flip-flops, the output signals of said two delay type flip-flops being input to the selector, and output the output signal; and
a counter controller configured to set a counter value in said counter according to a signal indicating the frequency dividing factor and whether the frequency dividing factor is a half integer, the signal being input to the counter controller, and instruct said selector which of the output signals of said two delay type flip-flops to output.

9. The radio receiver according to claim 8, wherein said counter is a swallow type counter.

10. The radio receiver according to claim 1, further comprising:
a detector circuit configured to detect the intermediate frequency signal generated in said signal adding circuit;
an amplitude and phase correcting circuit configured to correct amplitudes and phases of the two intermediate frequency signals generated in said frequency converter circuit and orthogonal to each other; and
an image removing filter configured to remove an image signal, the image removing filter being disposed in a stage succeeding said amplitude and phase correcting circuit and preceding said signal adding circuit,
wherein said controlling means outputs a control signal for correcting an amplitude error and/or a phase error in said amplitude and phase correcting circuit according to the signal detected in said detector circuit.

11. The radio receiver according to claim 1, wherein said radio receiver is used as a terrestrial digital television receiver.

12. A radio receiver comprising:
an antenna;
a switch circuit;
a first band-pass filter configured to pass a band component of a first band-pass characteristic of a signal input via said switch circuit;
a high-frequency gain controlling type amplifier circuit configured to control a gain of an output signal of said first band-pass filter;
a second band-pass filter configured to pass a band component of a second band-pass characteristic of an output signal of said high-frequency gain controlling type amplifier circuit, and output the passed band component to a frequency converter circuit;
the frequency converter circuit configured to generate a first intermediate frequency signal and a second intermediate frequency signal having an intermediate frequency and orthogonal to each other by multiplying the received radio frequency signal by a first oscillating signal and a second oscillating signal generated in a frequency divider circuit and orthogonal to each other;
an amplitude and phase correcting circuit configured to correct amplitudes and phases of the two intermediate frequency signals generated in said frequency converter circuit and orthogonal to each other;
an image removing filter configured to remove an image signal, the image removing filter being disposed in a stage succeeding said amplitude and phase correcting circuit and preceding a signal adding circuit;
the signal adding circuit configured to generate an intermediate frequency signal synthesized by adding together the first intermediate frequency signal and the second intermediate frequency signal generated in said image removing filter and orthogonal to each other;
an oscillator circuit configured to generate an oscillating signal of a first oscillation frequency, the oscillator circuit including a phase-locked circuit and a voltage-controlled oscillator circuit;
the frequency divider circuit configured to generate the first oscillating signal and the second oscillating signal having a second oscillation frequency and orthogonal to each other by frequency-dividing said oscillating signal generated by said oscillator circuit by a first frequency dividing factor;
a detector circuit configured to detect the intermediate frequency signal generated in said signal adding circuit; and
a test signal generating circuit configured to generate a test signal by frequency-dividing the oscillating signal having said first oscillation frequency generated in said oscillator circuit by a second frequency dividing factor, and input the test signal to another terminal of said switch circuit than a terminal supplied with the signal from said antenna, the test signal generating circuit including at least one second frequency divider circuit.

13. The radio receiver according to claim 12, wherein said radio receiver is used as a terrestrial digital television receiver.

* * * * *